United States Patent
Kim et al.

(10) Patent No.: US 6,813,425 B1
(45) Date of Patent: Nov. 2, 2004

(54) FIBER OPTIC CABLE FOR INCREASED TRANSMISSION CAPACITY AND WAVELENGTH DIVISION MULTIPLEXING OPTICAL TRANSMISSION SYSTEM USING THE SAME

(75) Inventors: Dong Young Kim, Seoul (KR); Yun Chur Chung, Taejon (KR)

(73) Assignee: LG Cable Ltd. and Korea Advanced Institute of Science and Technology (KR)

( * ) Notice: Subject to any disclaimer, the term of this patent is extended or adjusted under 35 U.S.C. 154(b) by 0 days.

(21) Appl. No.: 10/049,719

(22) PCT Filed: Aug. 12, 2000

(86) PCT No.: PCT/KR00/00899

§ 371 (c)(1),
(2), (4) Date: Jun. 17, 2002

(87) PCT Pub. No.: WO01/13146

PCT Pub. Date: Feb. 22, 2001

(30) Foreign Application Priority Data

Aug. 13, 1999 (KR) .................................. 10-1999-0033359

(51) Int. Cl.[7] .............................................. G02B 6/02
(52) U.S. Cl. ........................... 385/123; 385/28; 398/81
(58) Field of Search ............................. 385/24, 27, 28, 385/31, 50, 123–128; 398/81

(56) References Cited

U.S. PATENT DOCUMENTS

| | | | | |
|---|---|---|---|---|
| 5,327,516 A | * | 7/1994 | Chraplyvy et al. | 385/123 |
| 5,559,920 A | * | 9/1996 | Chraplyvy et al. | 385/123 |
| 5,611,016 A | | 3/1997 | Fangmann et al. | 385/100 |
| 6,366,728 B1 | * | 4/2002 | Way et al. | 385/123 |
| 6,404,964 B1 | * | 6/2002 | Bhagavatula et al. | 385/123 |
| 6,532,330 B1 | * | 3/2003 | Mollenauer | 385/123 |

FOREIGN PATENT DOCUMENTS

EP   0730354 A2   9/1996

OTHER PUBLICATIONS

Fabrizio Forghieri, R. W. Tkach and A. R. Chraplyvy, "WDM Systems with Unequally Spaced Channels", May 1995, Journal of Lightwave Technology, vol. 13, pp. 889–897.*
Stephen C. Mettler and Calvin M. Miller, "Optical Fiber Splicing", 1988, Optical Fiber Telecommunications II, Chapter 6, pp. 263–300.*
Parent KR Application 1999–33359, entitled "Fiber Optic Cable for Increased Transmission Capacity and Wavelength Division Multi–Plexing Optical Transmission System Using the Same", filed on Aug. 13, 1999.
International Application PCT/KR00/00899, entitled "Fiber Optic Cable for Increased Transmission Capacity and Wavelength Division Multi–Plexing Optical Transmission System Using the Same," filed Aug. 12, 2000.

* cited by examiner

Primary Examiner—David V. Bruce
Assistant Examiner—Therese Barber
(74) Attorney, Agent, or Firm—Santangelo Law Offices, P.C.

(57) ABSTRACT

Disclosed is a fiber optic cable for a wavelength division multiplexing (WDM) optical transmission system including a plurality of connected optical fibers, wherein each of the connected optical fibers is formed of a plurality of optical fibers respectively exhibiting different dispersion values and different dispersion slopes in a predetermined operating wavelength range while having different lengths and different effective areas, the optical fibers being connected to one another in an optional order.

54 Claims, 15 Drawing Sheets

Dcf = 3.0 ps/nm-km

Time (ps)

Optical Spectrum

Power (dBm)

Optical Frequency at 193.1 THz

Time (ps)

Optical Frequency at 193.1 THz

Dcf = 3.0 ps/nm-km

Time (ps)

Optical Frequency at 193.1 THz

Time (ps)

Optical Spectrum

Power (dBm)

Optical Frequency at 193.1 THz

Dcf=3.0 ps/nm- km

Time (ps)

Optical Frequency at 193.1 THz

FIBER OPTIC CABLE FOR INCREASED TRANSMISSION CAPACITY AND WAVELENGTH DIVISION MULTIPLEXING OPTICAL TRANSMISSION SYSTEM USING THE SAME

TECHNICAL FIELD

The present invention relates to a fiber optic cable used in a wavelength division multiplexing (WEM) optical transmission system, and more particularly to a fiber optic viable capable of suppressing influences, caused by a non-linearity of optical fibers, to a maximum while controlling dispersion characteristics to an appropriate level in order to obtain a maximum transmission capacity per optical fiber. Also, the present invention relates to WDM optical transmission system using the fiber optic cable, and more particularly to a WrM optical transmission system which can operate efficiently even when it uses a reduced channel spacing for an increase in transmission capacity.

BACKGROUND ART

Optical transmission techniques using optical fibers have rapidly been developed in that they can transmit a large quantity of data within a short period of time while involving a reduced transmission loss. In particular, such optical transmission techniques have further been advanced by virtue of development of a new optical fiber capable of transmitting signals for a long distance.while involving a reduced signal loss, and development of a superior light source such as a semiconductor laser.

However, known optical fibers involve a chromatic dispersion, that is, a phenomenon in which a signal is spread due to a difference in group velocity among the wavelength components of the signal. Due to such a chromatic dispersion, a signal overlap occurs at the receiving terminal, thereby resulting in a fatal problem such as an impossibility of demodulation. For this reason, attempts to minimize such a chromatic dispersion (hereinafter, simple referred to as a "dispersion") have been made. By virtue of such attempts, it has been found that a zero dispersion is achieved at an operating wavelength of 1,310 nm.

Meanwhile, it has been found, on the basis of the relation between the total loss and the wavelength in an optical fiber, that a minimum signal loss is exhibited at a wavelength of 1,550 nm even though an increased dispersion occurs, as compared to that occurring at 1,310 nm. In this connection, the operating wavelength of 1,550 nm could be used by virtue of the development of a new optical amplifier capable of amplifying the wavelength range of 1,530 nm to 1,565 nm. As a result, a non-repeating long distance transmission has been possible. This has resulted in the advent of a dispersion-shifted fiber (DSF) adapted to shift the zero dispersion from the wavelength of 1,310 nm, at which the zero dispersion is achieved in conventional cases, to the wavelength of 1,550 nm in order to obtain a minimum dispersion and a minimum signal loss.

In addition to such a development of optical fibers, a WDM system has been developed, which serves to multiplex a plurality of optical signals having different wavelengths so as to simultaneously transmit those optical signals through a single optical fiber. Using such a WDM system, it is possible to more rapidly transmit an increased amount of data. An optical communication system using a WDM scheme at a wavelength of 1,550 nm has already been commercially available.

Where the above mentioned DSF is used in such a WDM optical transmission. system, however, a signal distortion may occur even though a desired zero dispersion may be achieved. This is because the zero dispersion in the optical fiber may result in a non-linearity of the optical fiber, for example, a four-wave mixing in which lights of different wavelengths may be mixed together, even though a reduced signal distortion is obtained.

In particular, the most practical method usable in the WDM optical transmission system for a further increase in transmission capacity is to increase the number of channels used. In order to increase the number of channels used, however, it is necessary to use a reduced channel spacing because optical amplifiers use a limited amplification band. Such a reduced channel spacing may result in a more severe problem associated with the non-linearity of the optical fiber such as the four-wave mixing.

The non-linearity of an optical fiber is reduced at an increased channel spacing or an increased dispersion of the optical fiber. However, where the dispersion of the optical fiber increases, a degradation in transmission quality occurs inevitably due to a distortion of optical signals resulting from the increased dispersion.

Therefore, it is necessary to control the dispersion of the optical fiber in order to obtain a maximum transmission capacity of the WDM optical transmission system. In other words, an excessively high dispersion results in an increased signal distortion whereas an excessively low dispersion approximating to the zero dispersion results in a non-linearity of optical signals such as the four-wave mixing phenomenon, thereby generating a signal degradation. In this regard, it has been strongly required to develop an optical fiber capable of solving both the problem resulting from the dispersion and the problem resulting from the non-linearity.

U.S. Pat. No. 5,327,516 issued on Jul. 5, 1994 discloses an optical fiber for a WDM system which exhibits a dispersion ranging from 1.5 ps/nm-km to 4 ps/nm-km at a wavelength of 1,550 nm in order to achieve a suppression in non-linearity. The optical fiber disclosed in this patent is called a "non-zero dispersion-shifted fiber (hereinafter, referred to as an "NZ-DSF") in that it is configured to obtain a non-zero dispersion. Such an optical fiber is commercially available from Lucent Technologies In., U.S.A.

The NZ-DSF is significant in that it can suppress the four-wave mixing phenomenon by virtue of its dispersion value ranging from 1.5 ps/nm-km to 4 ps/nm-km. However, where a long-distance transmission is carried out using such an NZ-DSF or an increased number of channels, it is difficult to compensate for a surplus dispersion increased by a dispersion slope on the increased number of channels even though the dispersion accumulated on one channel may be compensated for by use of a dispersion compensation module (DCM) with a high negative dispersion value.

Furthermore, the NZ-DSF exhibits a relatively low dispersion value while having a relatively small effective area of 55 $\mu m^2$(in the case of a single-mode optical fiber, it has an effective area of about 80 $\mu m_2$. Since the effective area of the optical fiber is the actual area of an optical signal within the optical fiber, the optical signal has a reduced density for the same optical power as the optical fiber has an increased effective area. At a reduced density of the optical signal, the optical fiber exhibits a relatively reduced non-linearity. In this regard, where a very narrow channel spacing is used, it is difficult to sufficiently suppress the four-wave mixing phenomenon in the NZ-DSF with a relatively small effective area.

In particular, current WDM optical transfer systems show a tendency to use a channel spacing gradually reduced from 200 GHz to 100 GHz, and to 50 GHz. Such a tendency is due to the necessity of an increase in transmission capacity. However, where a very narrow channel spacing of 50 GHz is used, it is difficult for the NZ-DSF to be applied to WDM long-distance optical transmission systems.

FIG. 2a schematically illustrates an example of a WDM optical fiber system using an NZ-DSF. The illustrated optical fiber system, which is denoted by the reference numeral 20, has a channel spacing of 50 GHz and 8 channels. This optical fiber system 20 receives optical power of 0 dBm per channel from a light source. NZ-DSFs 24 are distributed over a total distance of 480 km. A dispersion-shifted optical fiber (DCF) 25 is also arranged in every span, along with an optical amplifier 23. The detailed specification of the optical transfer system 20 illustrated in FIG. 2a is described in the following Table 1.

TABLE 1

| System Specification | Value |
|---|---|
| Data Transmission Rate | 10 Gb/s |
| Channel Spacing | 50 GHz |
| Optical Power | 0 dBm per channel |
| Number of Channels | 8 |
| Total Fiber Optic Cable Length | 480 km |
| Distribution Span Length of Optical Amplifiers | 80 km |
| Optical Fiber Loss | 0.2 dB/km |

The optical transmission system of FIG. 2a mainly includes eight transmitting terminals 21 respectively adapted to provide lights of different wavelengths, a plurality of optical amplifiers 23 each adapted to amplify transmission light, and a receiving terminal 22 for receiving the transmission light. NZ-DSFs 24 are arranged between the transmitting terminals 21 and the receiving terminal 22.

Each of the NZ-DSFs 24 used in the optical transmission system of FIG. 2a exhibits an average dispersion of 3.0 ps/nm-km. The average dispersion is a value obtained by dividing a dispersion value accumulated during the transmission of an optical signal by a transmission distance. Each NZ-DSF 24 exhibits an accumulated dispersion value of about 240 ps/nm at a point of 80 km. This accumulated dispersion value is compensated for by a DSF 25 having a dispersion value of –240 ps/nm.

FIG. 2b is a graph depicting a variation in accumulated dispersion value exhibited when an optical signal is traveled for a distance of 80 km in the optical transmission system of FIG. 2a. Referring to FIG. 2b, it can be found that the accumulated dispersion value increases continuously in a linear fashion as the length of the NZ-DSF increases.

FIG. 3a is an eye diagram of an optical signal transmitted in the optical transmission system illustrated in FIG. 2a. As apparent from FIG. 3a, the eye of the optical signal is unclear, and partially opened. That is, the optical signal is in a severely degraded state. Such a signal degradation is mainly caused by a four-wave mixing phenomenon. FIG. 3b illustrates the optical spectrum of an optical signal transmitted in the optical transmission system of FIG. 2a. Referring to FIG. 3b, it can be found that a signal spectrum not associated with the transmitted optical signal is generated at portions of the optical signal indicated by the reference numeral 35. Such a signal spectrum is generated due to a four-wave mixing phenomenon. Where a WDM optical transmission system using NZ-DSFs uses a narrow channel spacing of 50 GHz, its transmission quality is severely degraded due to a four-wave mixing phenomenon. This can be found by referring to FIG. 3b.

Meanwhile, FIG. 4b is an eye diagram of an optical signal transmitted in an optical transmission system having the same configuration as that of FIG. 2a, except that optical fibers each having an increased dispersion value of 6 ps/nm-km are used in place of the NZ-DSFs in order to suppress the generation of a non-linearity. FIG. 4b illustrates the is optical spectrum of the optical signal. In this case, it is possible to suppress more or less the occurrence of a four-wave mixing phenomenon because the dispersion value of the optical fibers is higher than that of general NZ-DSFs (1.5 to 4 ps/nm-km). As a result, an improvement in signal degradation is obtained, as compared to the case of FIG. 3a. However, the eye of the optical signal is still incompletely opened due to a four-wave mixing phenomenon. In this regard, it can be found, from FIG. 4, that optical fibers exhibit an average dispersion value of 6 ps/nm-km or more so that they can be used in an optical transmission system having a reduced channel spacing of about 50 GHz.

In the case using conventional NZ-DSFs, therefore, it is impossible to perfectly transmit optical signals due to a four-wave mixing phenomenon occurring when the reduced channel spacing of 50 GHz is used for an increase in transmission capacity. This result causes a limitation on the maximum transmission capacity of the optical transmission system.

In this regard, where a WDM optical transmission system is desired to reduce the channel spacing to 50 GHz for an increase in the transmission capacity.per optical fiber, it is important to develop a fiber optic cable having further improvements in dispersion characteristics and suppression characteristics for the four-wave mixing phenomenon, as compared to conventional NZ-DSFs.

DISCLOSURE OF INVENTION

Therefore, an object of the invention is to solve the above mentioned problems involved in the related art, and to provide a fiber optic cable capable of being applied to a WDM optical transmission system using a reduced channel spacing while maximizing the transmission capacity per optical fiber in the WDM optical transmission system.

Another object of the invention is to provide a WDM optical transmission system using the fiber optic cable adapted to accomplish the above mentioned object of the invention, which uses a channel spacing of 50 GHz while having division multiplexing (WDM) optical transmission system including a plurality of connected fibers is formed of a plurality of optical fibers the fiber optic cable.

In optical fibers, wherein each of the connected increased transmission capacity by virtue of the use of optical order to an invention provides a fiber optic cable for a wavelength accomplish this object, in accordance with one aspect, the present respectively exhibiting different dispersion values and different dispersion slopes in a predetermined operating wavelength range while having different lengths and different effective areas, the optical fibers being connected to one another in an optional order.

In accordance with another aspect, the present invention provides a fiber optic cable for a WDM optical transmission system including a plurality of connected optical fibers, wherein each of the connected optical fibers comprises: first optical fiber exhibiting a first dispersion value and a first dispersion slope in a predetermined operating wavelength range while having a first length and a first effective area;

and a second optical fiber exhibiting a second dispersion value and a second dispersion slope in the predetermined operating wavelength range while having a second length and a second effective area; the first and second optical fibers being connected together in an optional order.

In accordance with another aspect, the present invention provides a fiber optic cable for a WDM optical transmission system including a plurality of connected optical fibers, wherein each of the connected optical fibers comprises: a first optical fiber exhibiting a first dispersion value and a first dispersion slope in a predetermined operating wavelength range while having a first length and a first effective area; a second optical fiber exhibiting a second dispersion value and a second dispersion slope at the predetermined operating wavelength range while having a second length and a second effective area; and a third optical fiber exhibiting the first dispersion value and the first dispersion slope at the predetermined operating wavelength range while having a third length and the first effective area; the first optical fiber, the second optical fiber, and the third optical fiber being connected to one another in this order.

The present invention also provides a WDM optical transmission system having a predetermined channel spacing and a predetermined number of channels, comprising: a transmitting terminal for providing a plurality of optical signals respectively having different wavelengths; a multiplexer connected to the transmitting terminal and adapted to multiplex the optical signals; a plurality of fiber optic cables each including a plurality of connected optical fibers, each of the connected optical fibers being formed of a plurality of optical fibers respectively exhibiting different dispersion values and different dispersion slopes in a predetermined operating wavelength range while having different lengths and different effective areas, the optical fibers being connected to one another in an optional order; connecting means for interconnecting the fiber optic cables; optical amplifiers for amplifying the optical signal being transmitted through the fiber optic cables; a demultiplexer for demultiplexing the optical signal transmitted through the fiber optic cables; and a receiving terminal connected to the demultiplexer and adapted to receive the demultiplexed optical signal.

In accordance with another aspect, the WDM optical transmission system has a channel spacing of 50 GHz.

In accordance with the present invention, the connected optical fibers, each of which is formed of optical fibers of different kinds connected to one another, exhibit dispersion characteristics capable of sufficiently suppressing the occurrence of a four-wave mixing phenomenon. Thus, the present invention can provide a WDM optical transmission system having an increased transmission capacity while operating without involving any signal distortion.

In accordance with the present invention, the connected optical fibers of the fiber optic cable are formed by connecting optical fibers, respectively having dispersion values of opposite signs, in an alternating fashion. In accordance with such a connection between optical fibers of different kinds, a high positive accumulated dispersion value is first exhibited during the transmission of an optical signal through the fiber optic cable. By virtue of such a high positive accumulated dispersion value, the occurrence of a four-wave mixing phenomenon is considerably suppressed. The high positive accumulated dispersion value is then rapidly compensated for as the optical fiber having the positive dispersion value is connected to another optical fiber having a negative dispersion value. Such high accumulated dispersion value generating and compensating procedures are repeatedly carried out. By virtue of the compensation for the high accumulated dispersion value, accordingly, a desired average dispersion value is maintained in every fiber optic cable. By virtue of the high accumulated dispersion value repeatedly exhibited during a travel of the optical signal, the occurrence of a four-wave mixing phenomenon is continuously suppressed.

However, where each of the optical fibers having the same dispersion value has an increased length of 10 km or more, there is a difficulty in the manufacture and installation of the fiber optic cable because the length of the fiber optic cable is 20 km or more. In this connection, the present invention provides a fiber optic cable having an optimum length and an optimum dispersion value capable of suppressing the occurrence of a four-wave mixing phenomenon while allowing a practical manufacture of the fiber optic cable.

Therefore, the fiber optic cable according to the present invention can sufficiently suppress the occurrence of a four-wave mixing phenomenon while exhibiting an average dispersion value equivalent to that of the conventional NZ-DSF.

In addition, the fiber optic cable of the present invention can control the effective area of each optical fiber forming the connected optical fiber. That is, each optical fiber can have an effective area capable of suppressing the occurrence of a four-wave mixing phenomenon. Accordingly, a more effective suppression for the occurrence of a four-wave mixing phenomenon is achieved.

Since the fiber optic cable of the present invention can remarkably suppress the occurrence of a four-wave mixing phenomenon, it is possible to greatly suppress a degradation in transmission signals in a WCM optical transmission system using a reduced channel spacing for an increase in transmission capacity.

BRIEF DESCRIPTION OF DRAWINGS

The above objects, and other features and advantages of the present invention will become more apparent after a reading of the following detailed description when taken in conjunction with the drawings, in which:

FIGS. 3a and 3b illustrate operation characteristics of the optical transmission system shown in FIG. 2a, in which FIG. 3a is an eye diagram, and FIG. 3b is an optical spectrum diagram;

FIGS. 4a and 4b illustrate operation characteristics of the optical transmission system shown in FIG. 2a when the average dispersion value of the optical transmission system is set to 6 ps/nm-km, in which FIG. 4a is an eye diagram, and FIG. 4b is an optical spectrum diagram;

FIGS. 7a and 7b illustrate operation characteristics of the optical transmission system shown in FIG. 6a, in which FIG. 7a is an eye diagram, and FIG. 7b is an optical spectrum diagram;

FIG. 8 is a graph illustrating a control for the average dispersion in the optical transmission system of FIG. 6a.

FIGS. 9a and 9b illustrate operation characteristics of a 50 GHz optical transmission system using fiber optic cables of the present invention having an effective area of 55 $\mu m^2$, in which FIG. 9a is an eye diagram, and FIG. 9b is an optical spectrum diagram;

FIG. 10 is a graph illustrating a control for the effective area in the optical transmission system shown in FIG. 6a;

FIGS. 14a and 14b illustrate operation characteristics of the optical transmission system shown in FIG. 13a, in which FIG. 14a is an eye diagram, and FIG. 14b is an optical spectrum diagram.

BEST MODE FOR CARRYING OUT THE INVENTION

Figure 5:
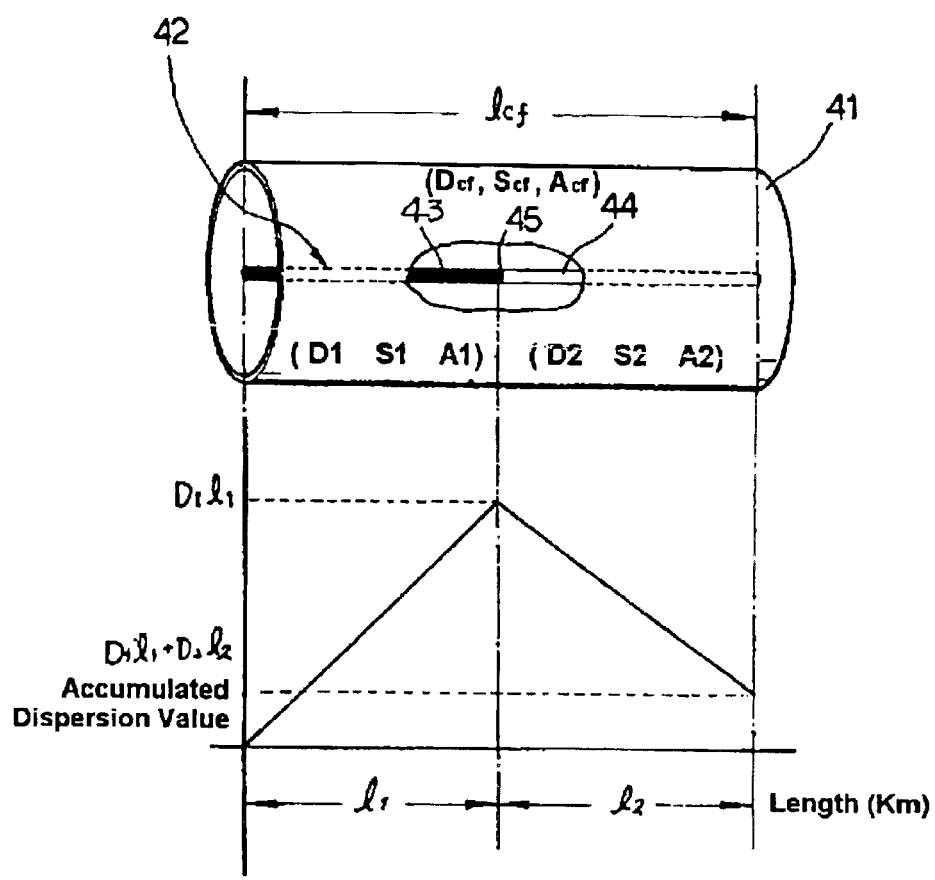
FIG. 5 is a schematic view illustrating the concept of a 2-section type fiber optic cable according to the present invention.

Referring to FIG. 5, the concept of a fiber optic cable according to the present invention is illustrated.

In FIG. 5, the fiber optic cable of the present invention is denoted by the reference numeral 41. Although a plurality of connected optical fibers 42 are included in the fiber optic cable 41, only one connected optical fiber 42 is shown for the convenience of description.

The connected optical fiber 42 shown in FIG. 5 is formed by connecting a first optical fiber 43 and a second optical fiber 44 to each other. The connection between the first and second optical fibers 43 and 44 may be achieved at a connection point 45 using a well-known splicing method. Details of the splicing method used in the present invention are disclosed in an article "Optical Fiber Splicing", by Stephen C. Mattler and et al, in "Optical Fiber Telecommunications II: 1988", pp 263–300.

The first and second optical fibers 43 and 44 are of different kinds having different characteristics, respectively. That is, the first and second optical fibers 43 and 44 have different dispersion values, that is, a fist dispersion value $D_1$ and a second dispersion value $D_2$, different effective areas, that is, a first effective area $A_1$ and a second effective area $A_2$, and different lengths, that is, a first length $l_1$ and a second length $l_2$, respectively. The first and second optical fibers 43 and 44 also have a first dispersion slope $S_1$ and a second dispersion slope $S_2$.

Since the fiber optic cable 41 including the connected optical fiber 42 is adapted to be used in a WDM optical transmission system, the connected optical fiber 42 should have a dispersion value and an effective area which are required in the WDM optical transmission system. The dispersion value $D_{cf}$, dispersion slope $S_{cf}$, length $l_{cf}$, and effective area $A_{cf}$ of the connected optical fiber 42 may be controlled to correspond to those required in the system by adjusting respective dispersion values and respective effective areas of the first and second optical fibers 43 and 44.

The length $l_{cf}$ of the connected optical fiber 42 corresponds to the sum of the first length $l_1$ of the first optical fiber 43 and the second length $l_2$ of the second optical fiber 44. The average dispersion value $D_{cf}$ of the connected optical fiber 42 is determined by the following Equation 1:

$$D_{cf}(\lambda) = \frac{D_1(\lambda)l_1 + D_2(\lambda)l_2}{l_1 + l_2} \qquad \text{[Equation 1]}$$

As apparent from Equation 1, the dispersion value of the connected optical fiber 42 is adjustable by adjusting respective dispersion values and respective lengths of the first and second optical fibers 43 and 44.

The dispersion slope $S_{cf}$ of the connected optical fiber 42 corresponds to a value obtained by differentiating the dispersion value of the connected optical fiber 42 with respect to wavelength. This dispersion slope $S_{cf}$ can be derived using the following Equation 2:

$$S_{cf}(\lambda) = \qquad \text{[Equation 2]}$$
$$\frac{\partial D_{cf}(\lambda)}{\partial \lambda} = \frac{\frac{\partial D_1(\lambda)}{\partial \lambda}l_1 + \frac{\partial D_2(\lambda)}{\partial \lambda}l_2}{l_1 + l_2} = \frac{S_1(\lambda)l_1 + S_2(\lambda)l_2}{l_1 + l_2}$$

Also, the effective area $A_{cf}$ of the connected optical fiber 42 having an influence on a non-linearity of the connected optical fiber 42 can be derived, based on the first and second effective areas of the first and second optical fibers 43 and 44 and respective loss coefficients per length of those optical fibers 43 and 44, using the following Equation 3:

$$A_{cf} = \frac{L_1 L_2 - 1}{\frac{\alpha_3}{\alpha_1}\frac{L_1 - 1}{A_1} + \frac{\alpha_3}{\alpha_2}\frac{L_1(L_2 - 1)}{A_2}} \qquad \text{[Equation 3]}$$

In Equation 3, "$\alpha_1$" and "$\alpha_2$" represent respective loss indicia (/km) of the first and second optical fibers 43 and 44 and can be expressed by "$\alpha_1 = 0.1 \times a_1 \times \log(10)$" and "$\alpha_2 = 0.1 \times a_2 \times \log(10)$", respectively. "a_{1}" and "a_{2}" represent respective loss coefficients (dB/hm) of the first and second optical fibers 43 and 44. Also, "$\alpha_3$" is expressed by $$"\alpha_3 = \frac{\alpha_1 l_1 + \alpha_2 l_2}{l_1 + l_1}",$$

and "$L_2$" and "$L_2$" are expressed by "$L_1 = \exp(-\alpha_1 l_1)$" and "$L_2 = \exp(-\alpha_2 l_2)$", respectively.

The dispersion value $D_{cf}$, dispersion slope $S_{cf}$, and effective area $A_{cf}$ of the connected optical fiber 42 can be controlled to correspond to those required in the system by adjusting respective dispersion values, respective dispersion slopes, respective effective areas, and respective lengths of the first and second optical fibers 43 and 44, based on Equations 1, 2, and 3.

The first and second optical fibers 43 and 44 should have dispersion values of opposite signs because they compensate for the dispersion value of each other. Typically, the first optical fiber 43 has a positive dispersion value whereas the second optical fiber 44 has a negative dispersion value. Of course, the first and second optical fibers 43 and 44 are not limited to the above condition.

As mentioned above, optical fibers having dispersion values of opposite signs are connected in an alternating fashion to form a connected optical fiber. However, the resultant connected optical fiber has an average dispersion value of non-zero so as to suppress the occurrence of a four-wave mixing phenomenon.

Respective dispersion values of the first and second optical fibers 43 and 44 should be relatively higher than those in conventional NZ-DSFs. The difference between the dispersion values of the first and second optical fibers 43 and 44 should also be higher than those in conventional NZ-DSFs. Preferably, the first and second optical fibers 43 and 44 exhibit a dispersion value difference of 10 ps/rm-km or more.

For the first optical fiber 43, a conventional single-mode optical fiber may be used. This single-mode optical fiber exhibits a positive dispersion value and a relatively large effective area. By virtue of such a single-mode optical fiber, it is possible to reduce the manufacturing costs of the fiber optic cable according to the present invention in that the single-mode optical fiber is commercially available.

Since the first and second optical fibers 43 and 44 have high dispersion values and exhibit a high difference between the dispersion values thereof, they should be connected to each other. In accordance with the currently known techniques, it is difficult to continuously form an optical fiber having portions respectively corresponding to the first and second optical fibers exhibiting a high dispersion value difference, by use of the same preform without involving no connection procedure, but while using a desired refractive index distribution.

Where an optical fiber having portions exhibiting a high dispersion value difference therebetween is manufactured in the same preform, a dispersion shifted region is inevitably formed at the connection between the portions of the optical fiber respectively corresponding to the first and second optical fiber. Since a reduced dispersion value is exhibited in the dispersion shifted region, four-wave mixing phenomena are generated in an amount larger than an expected amount, thereby resulting in an increased degradation in the performance of the optical transmission system.

Thus, it is difficult to implement a fiber optic cable exhibiting a high dispersion value difference or a sharp variation in dispersion value between portions thereof respectively corresponding to the first and second optical fibers, using the same preform, as in the fiber optic cable according to the present invention. On the other hand, where a fiber optic cable is manufactured by connecting optical fibers exhibiting a high dispersion value difference therebetween in accordance with the present invention, it is unnecessary to separately form a dispersion shifted region between the first and second optical fibers. Accordingly, there is an advantage in that the four-wave mixing phenomenon resulting from the provision of the dispersion shifted region does not occur. It is also possible to obtain a sufficiently high dispersion value difference.

FIG. 5 also schematically illustrate a graph depicting a variation in the accumulated dispersion value of the connected optical fiber 42 depending on the length. This graph is shown below the fiber optic cable 41 in a state corresponding to the structure of the connected optical fiber 42. The variation in accumulated dispersion value shown in the graph is associated with the case in which the first and second optical fiber 43 and 44 have a positive dispersion value and a negative dispersion value, respectively, while exhibiting a relatively high dispersion value therebetween.

As shown in FIG. 5, the accumulated dispersion value of an optical signal increases gradually as the optical signal travels along the length $l_1$ of the first optical fiber 43. As mentioned above, the increase in the accumulated dispersion value has a sharp gradient because the dispersion value $D_1$ of the first optical fiber 43 is high. The accumulated dispersion value increases to a value of "$D_1 l_1$" when the optical signal reaches the connection point 45 between the first and second optical fiber 43 and 44. As the optical signal begins to travel along the second optical fiber 44 having a high negative dispersion value $D_2$, the accumulated dispersion value is gradually reduced by virtue of the second optical fiber 44. The accumulated dispersion value is finally reduced to a value of "$D_1 l_1 + D_2 l_2$".

Thus, the accumulated dispersion value of the connected optical fiber in the fiber optic cable 41 is compensated for so as to correspond to an appropriate value as it is abruptly increased by virtue of the first optical fiber 43 having a high positive dispersion value and then abruptly decreased by virtue of the second optical fiber 44 having a high negative dispersion value. Therefore, although respective dispersion values of the first and second optical fibers 43 and 44 are high, the average value of the connected optical fiber 42 is appropriately maintained in the fiber optic cable 41.

By virtue of such dispersion characteristics of the connected optical fiber 42, the occurrence of a four-wave mixing phenomenon is sufficiently suppressed. That is, a very high accumulated dispersion value is exhibited at a point, corresponding to the length of $l_1$, in the fiber optic cable 41 by virtue of the high positive dispersion value $D_1$ of the first optical fiber 43. This very high accumulated dispersion value serves to sufficiently suppress the occurrence of a four-wave mixing phenomenon. Thus, the fiber optic cable 41 can suppress a non-linearity such as a four-wave mixing in that the connected optical fiber 42 can be adjusted to have an appropriate average dispersion value, and that a high accumulated dispersion value is temporarily exhibited in the fiber optic cable 41 by virtue of the first or second optical fiber 43 or 44 of the connected optical fiber 42.

In accordance with the above mentioned configuration, the dispersion value can be appropriately adjusted to correspond to an appropriate value for every fiber optic cable. A suppression of a non-linearity phenomenon is also achieved for every fiber optic cable. Accordingly, the whole control of the dispersion value and the four-wave mixing phenomenon can be very easily achieved.

The fiber optic cable of FIG. 5 according to the present invention can operate, without any problems, in a WDM optical transmission system using a channel spacing of 50 GHz by virtue of the above mentioned structural advantages. Accordingly, it is possible to achieve an increase in the transmission capacity of the WDM optical transmission system.

Now, the optical transmission system using the fiber optic cable according to the present invention will be described in detail.

Figure 1:
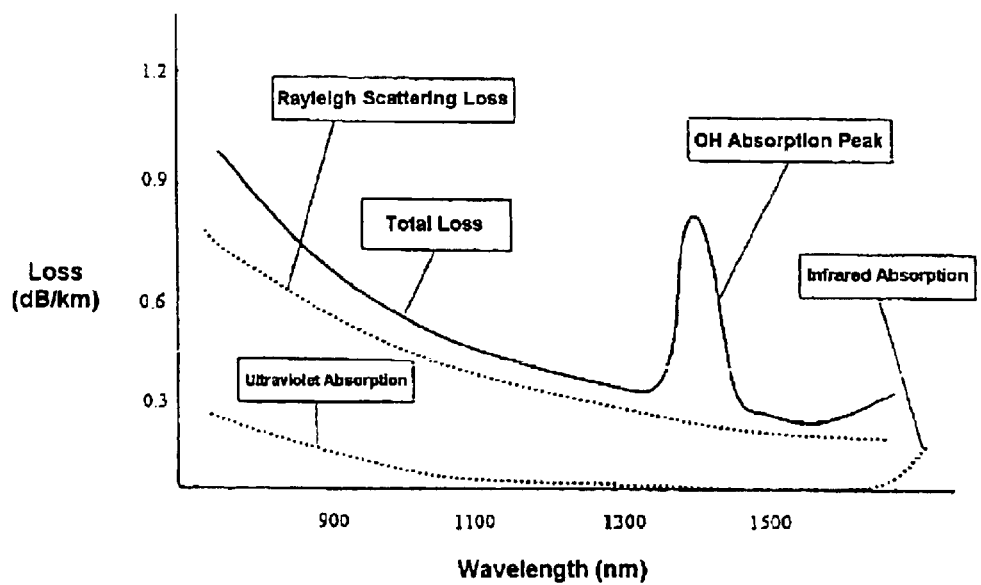
FIG. 1 is a graph depicting an optical signal loss depending on the wavelength.
Figure 2A:
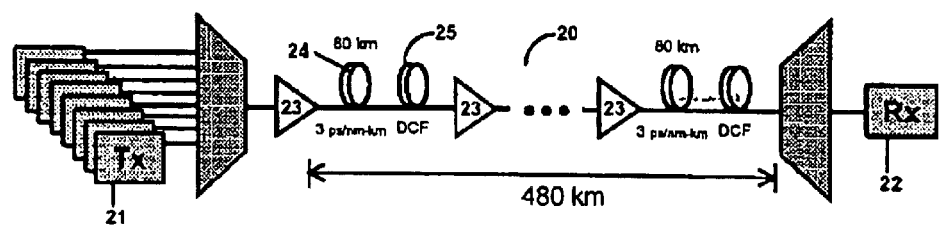
FIG. 2a is a schematic view illustrating an example of a 8-channel WDM optical fiber system using an NZ-DSF while having a channel of 50 GHz.
Figure 2B:
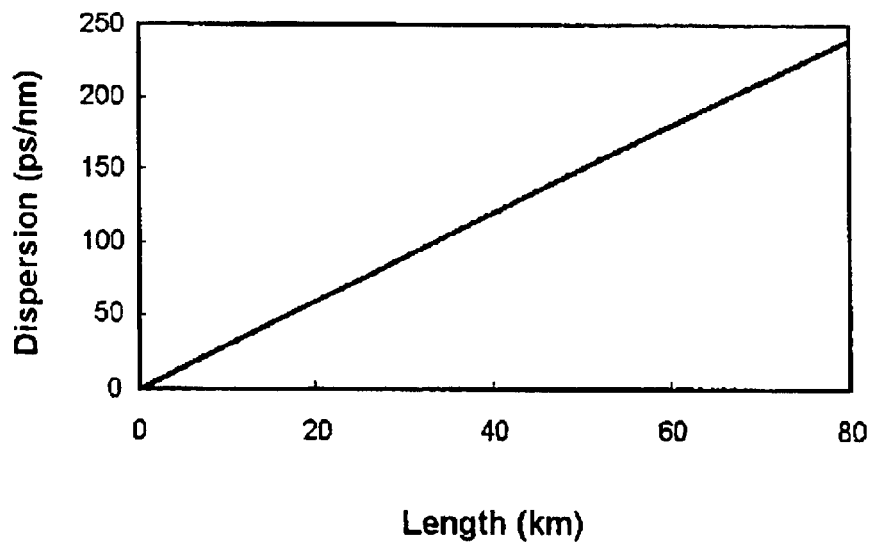
FIG. 2b is a graph depicting a variation in accumulated dispersion value exhibited in an optical amplifier section of the optical transmission system, shown in FIG. 2a, depending on the optical fiber length.
Figure 6A:
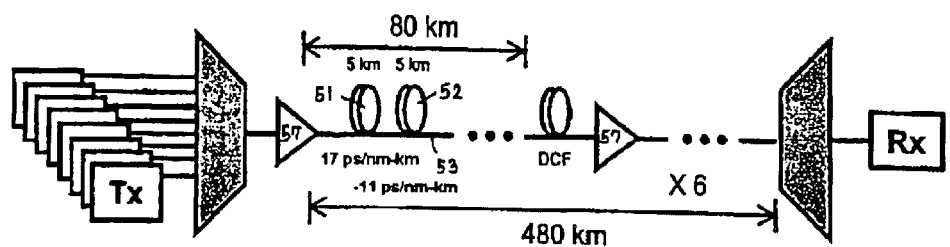
FIG. 6a is a schematic view illustrating an example of a 8-channel WDM optical fiber system having a channel of 50 GHz while using 2-section type fiber optic cables according to the present invention.

FIG. 6a illustrates an example of a 50-GHz WDM optical transmission system using fiber optic cables each having the configuration of FIG. 5. For the comparison with the case using a conventional NZ-DSF, the optical transmission system of FIG. 6a has the same system specification as that of FIG. 2a (refer to Table 1). Accordingly, the fiber optic cables according to the present invention extend in series over a distance of 480 km between the transmitting and receiving terminals. Also, the span length between adjacent optical amplifiers 57 is 80 km, and the loss coefficient of each optical fiber is 0.2 dB/km.

As shown in FIG. 6a, the first optical fiber, which is denoted by the reference numeral 51, exhibits a dispersion value of 17 ps/nm-km, and has a length of 5 km. The second optical fiber, which is denoted by the reference numeral 52, exhibits a dispersion value of −11 ps/nm-km, and has a length of 5 km. Accordingly, the connected optical fiber, which is denoted by the reference numeral 53, has a total length of 10 km. Also, the length of one fiber optic cable is 10 km. Therefore, 8 fiber optic cables are arranged between adjacent optical amplifiers 57.

Figure 6B:
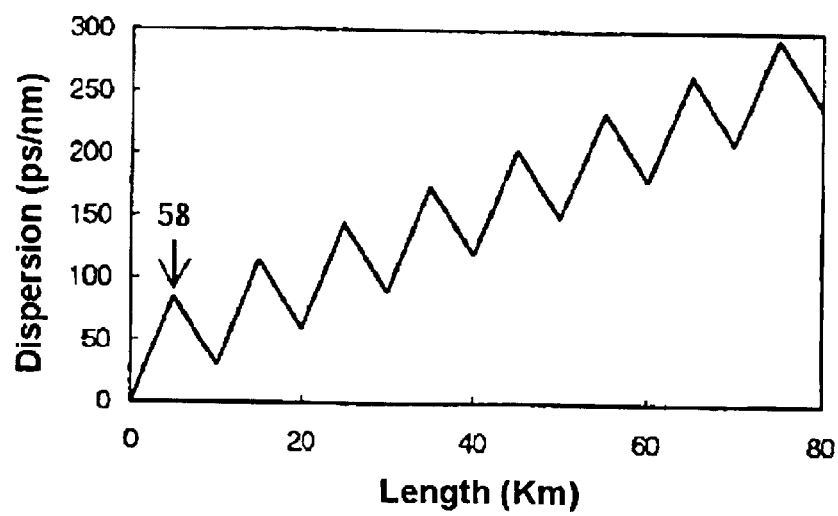
FIG. 6b is a graph depicting a variation in accumulated dispersion value exhibited in an optical amplifier section of the optical transmission system, shown in FIG. 6a, depending on the optical fiber length.

FIG. 6b illustrates a variation in the accumulated dispersion value of an optical signal exhibited in the optical transmission system of the present invention shown in FIG. 6a, depending on the length of the optical transmission system. An accumulated dispersion value 58 of 85 ps/nm is exhibited at a point of 5 km by the first optical fiber 51. By virtue of this accumulated dispersion value 58, the occurrence of a four-wave mixing phenomenon is suppressed. As the optical signal is further advanced from the point of 5 km, the accumulated dispersion value is gradually reduced from the accumulated dispersion value 58 of 85 ps/nm by the second optical fiber 52 having a negative dispersion value of −11 ps/nm-km. As a result, the accumulated dispersion value is reduced to 30 ps/nm at a point of 10 km. The connected optical fiber 53 in the first fiber optic cable has an average dispersion value of 3 ps/m-km.

As shown in FIG. 6b, a high dispersion value is repeatedly exhibited in 8 fiber optic cables arranged in the span length of 80 km. By virtue of such repeated high dispersion values, the occurrence of a four-wave mixing phenomenon is considerably suppressed. Each high dispersion value obtained by the first optical fiber in each fiber optic cable is compensated for by the second optical fiber which is connected to the first optical fiber while having a negative dispersion value. Accordingly, the average dispersion value of each fiber optic cable is the same as the average dispersion value of 3 ps/nm-km in the conventional NZ-DSF.

Where optical fibers of the same kind are used in an optical transmission system using a channel spacing of about 50 GHz for an increase in transmission capacity in accordance with conventional techniques, they should have an average dispersion value of 6 ps/nm-km or more. However, although the fiber optic cable of FIG. 6a according to the present invention has an average dispersion value of 3 ps/nm-km, there is no problem because it uses connected optical fibers each formed of two optical fibers of different kinds connected to each other while having high dispersion values, respectively.

Figure 7A:
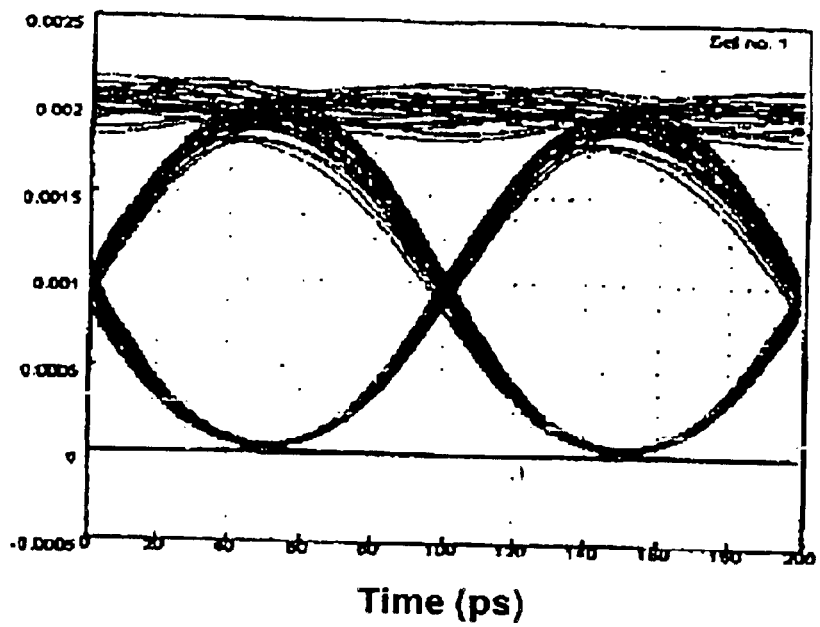
Figure 7B:
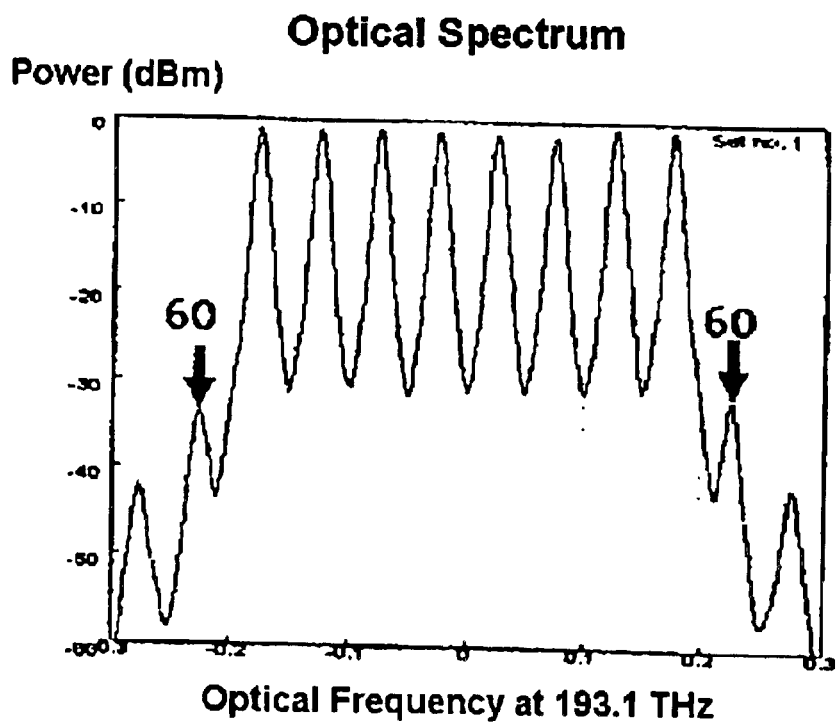

Referring to FIGS. 7a and 7b, the operation characteristics of the WDM optical transmission system using the fiber optic cable according to the present invention are illustrated, respectively.

Figure 3A:
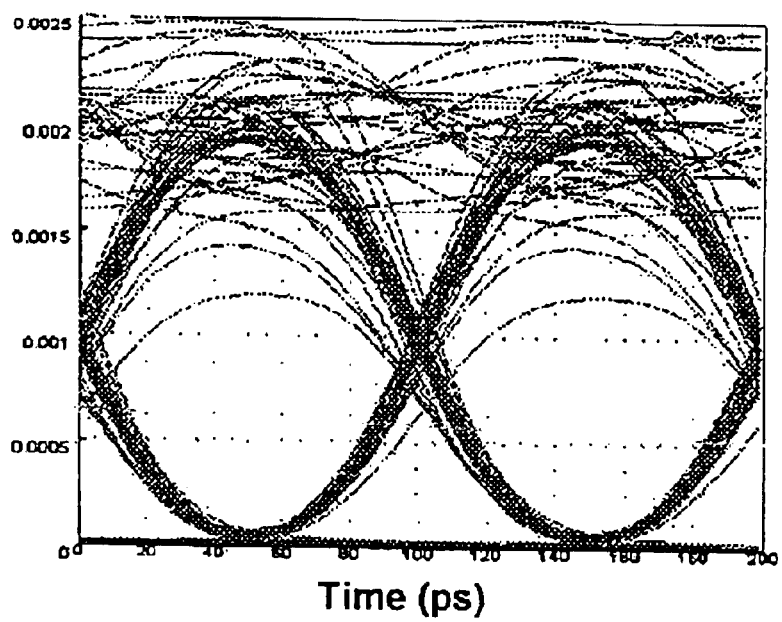

FIG. 7a illustrates the eye diagram of an optical signal transmitted in the optical transmission system of FIG. 6a. As apparent from FIG. 6a, the eye of the optical signal is clear and greatly opened. That is, there is no degradation of the optical signal caused by a four-wave mixing phenomenon. On the other hand, referring to FIG. 3a, which is the eye diagram of an optical signal transmitted in an optical transmission system using NZ-DSFs, it can be found that the eye of the optical signal is unclear, and the optical signal is in a severely degraded state, as compared to the eye diagram of FIG. 7a using the fiber optic cables according to the present invention.

Figure 3B:
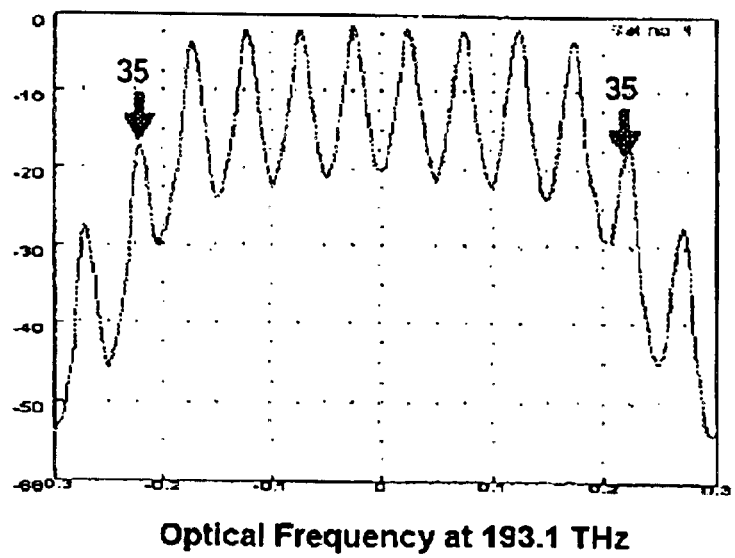
Figure 4A:
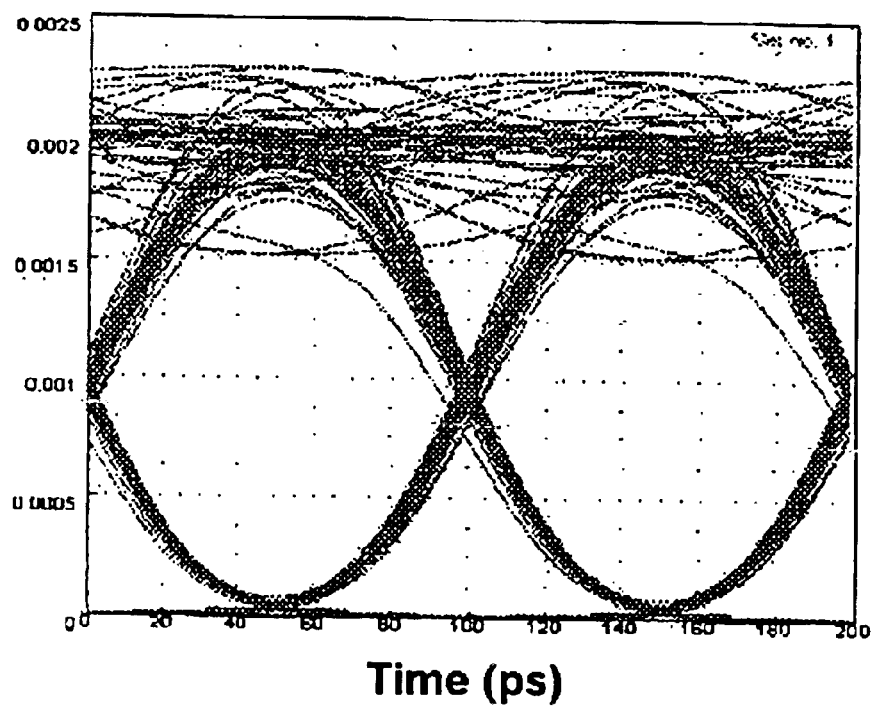
Figure 4B:
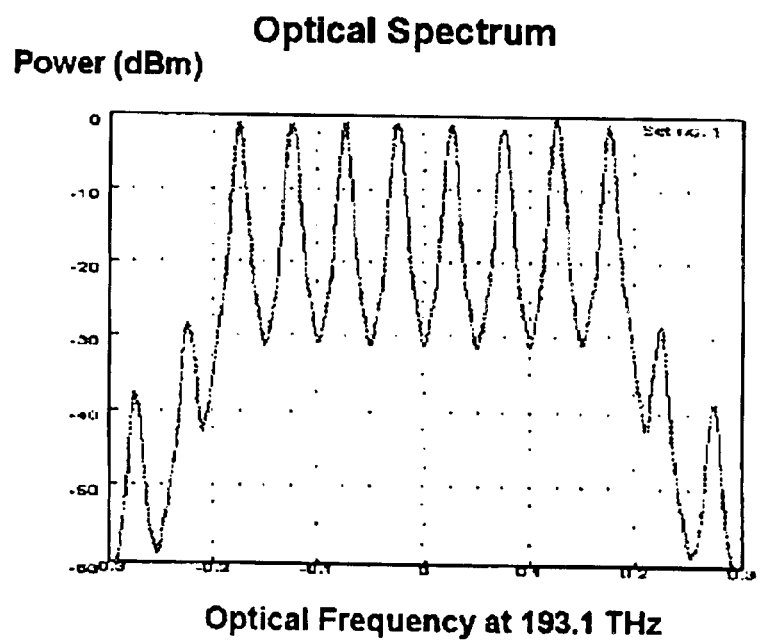

FIG. 7b is a graph depicting the optical spectrum of the optical signal transmitted in the optical transmission system of FIG. 6a. The portions of the optical spectrum indicated by the arrows 60 in FIG. 7b are indicative of signals generated due to a four-wave mixing phenomenon. Referring to FIG. 7b, it can be found that the four-wave mixing phenomenon is considerably suppressed, as compared to the optical spectrum of FIG. 3b generated in the case using NZ-DSFs.

Figure 8:
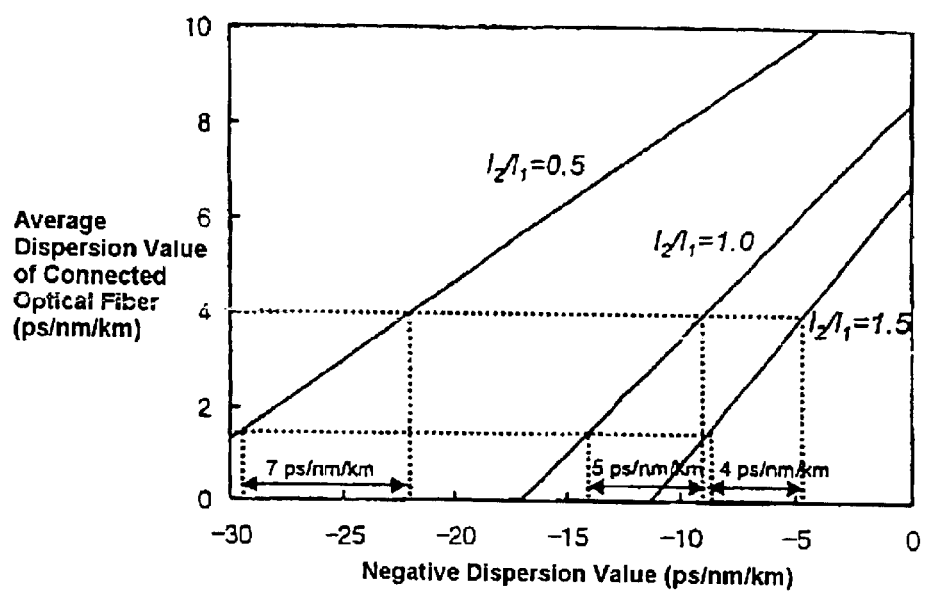

FIG. 8 is a graph illustrating a control for the average dispersion in the optical transmission system of FIG. 6a. As shown in FIG. 8, the average dispersion is controlled by adjusting the length ratio between the first and second optical fibers 51 and 52 and the negative dispersion value of the second optical fiber 52 under the condition in which the dispersion value of the first optical fiber 51 is set to +17 ps/nm-km.

As apparent from FIG. 8, where the connected optical fiber 53 is desired to have an average dispersion value ranging from 1.5 ps/nm-km to 4 ps/lm-kn under the condition in which the first and second optical fibers 51 and 52 have the same length, this can be achieved by appropriately determining the negative dispersion value of the second optical fiber 52 within a range between −14 ps/nm-km and −9 ps/nm-km. Referring to FIG. 8, it can be found that the average dispersion value of the connected optical fiber 53 can be easily controlled by controlling respective lengths of the first and second optical fibers 51 and 52 or respective dispersion values, that is, the positive and negative dispersion values, of the first and second optical fibers 51 and 52.

Meanwhile, referring to the operation characteristics of the optical transmission system of FIG. 6a exhibited under the condition in which the first and second optical fibers 51 and 52 have an effective area of 55 $\mu m^2$, respectively, it can be found that the occurrence of a four-wave mixing phenomenon is remarkably suppressed, as compared to the case using NZ-DSFs having the same effective area as that of the first and second optical fibers 51 and 52.

Figure 9A:
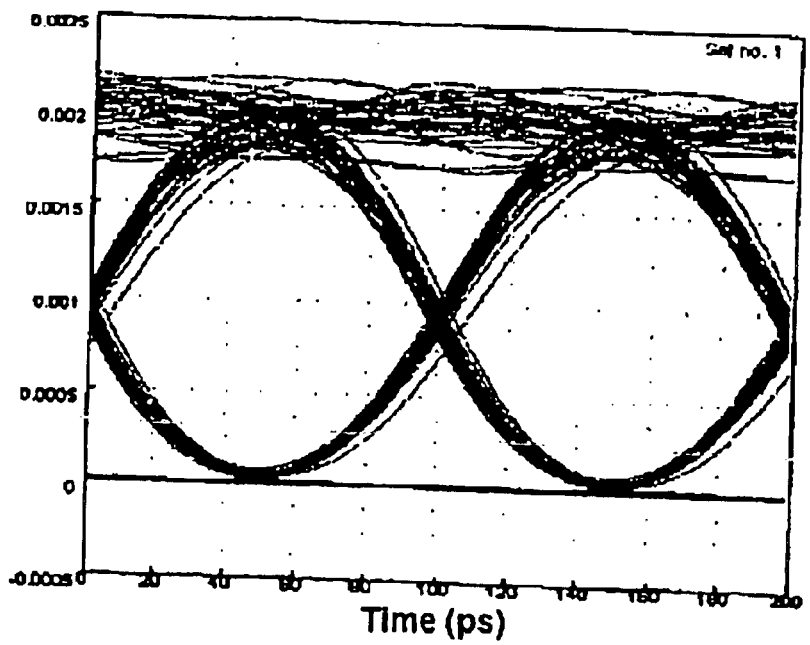
Figure 9B:
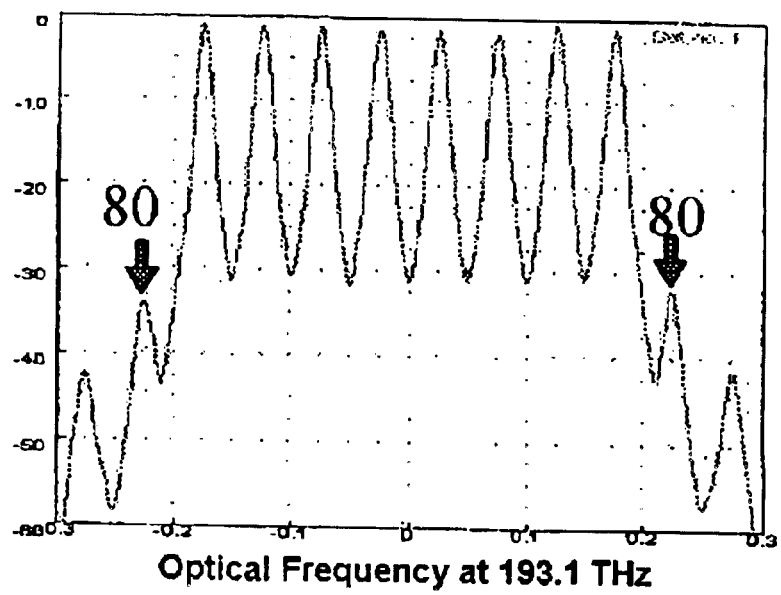

FIGS. 9a and 9b illustrate the eye diagram and the optical spectrum, respectively, in the case in which the first and second optical fibers 51 and 52 have an effective area of 55 $\mu m^2$, respectively, and thus, the connected optical fiber 53 has an effective area of about 55 $\mu m^2$. Referring to the drawings, in particular, FIG. 9b, it can be found that the occurrence of a four-wave mixing phenomenon is considerably suppressed, as indicated by the arrows 80 in FIG. 9b, as compared to the conventional case using NZ-DSFs (the four-wave mixing phenomenon in the conventional case is indicated by the arrows 35 in FIG. 3b), even though a slightly increased four-wave mixing phenomenon is exhibited as compared to the case in which the first optical fiber 51 has an effective are a of 80 $\mu m^2$. This is because the occurrence of a four-wave mixing phenomenon is repeatedly suppressed in the fiber optic cables by virtue of a high accumulated dispersion value of each fiber optic cable.

Now, the suppression of the four-wave mixing phenomenon achieved by controlling respective effective areas of the optical fibers forming each connected optical fiber in the optical transmission system of FIG. 6a will be described.

Assuming that the first optical fiber 51 has an effective area of 80 $\mu m^2$, and the second optical fiber 52 has an effective area of 55 $\mu m^2$, the connected optical fiber 53 has an effective area of 66 $\mu m^2$, as calculated using Equation 3. That is, the connected optical fiber 53 of the present invention has an increased effective area, as compared to the conventional NZ-DSF having an effective area of 55 $\mu m^2$. Since an increased effective area results in an increased suppression of the non-linearity of an optical fiber, the fiber optic cable of the present invention exhibits an increased suppression of the four-wave mixing phenomenon, and thus, further improved characteristics.

Referring to FIGS. 7a and 7b again, the operation characteristics of the optical transmission system using the fiber optic cable of the present invention having an increased effective area of 66 $\mu m^2$ are illustrated, respectively. As apparent from the drawings, in particular, FIG. 7b, optical spectrum components, indicated by the arrows 60 in FIG. 7b, resulting from a four-wave mixing phenomenon are in a remarkably suppressed state, as compared to the optical spectrum of FIG. 3b exhibited in the NZ-DSF.

Figure 10:
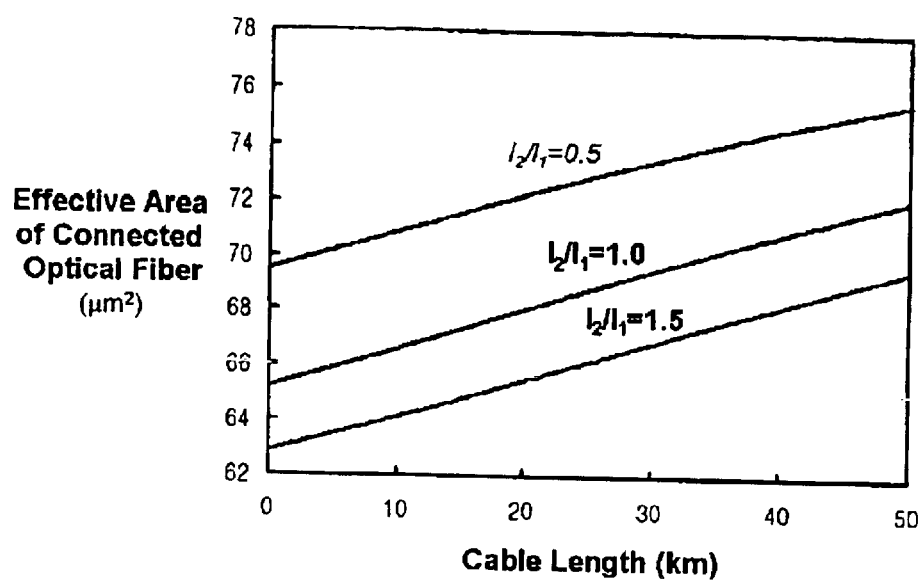

FIG. 10 is a graph illustrating a control for the effective area depending on the length ratio between the first and second optical fibers 51 and 52 in the case in which respective effective areas of the first optical fiber 51 are 80 $\mu m^2$ and 55 $\mu m^2$, and the loss coefficient of the second optical fiber is set to 0.2 dB/km. As shown in FIG. 6a, where the first and second optical fibers 51 and 52 have a length of 5 km, respectively, and thus, have a length ratio of 1 therebetween, the effective area of the connected optical fiber 53 increases gradually as the fiber optic cable has an increased length. In this case, the connected optical fiber 53 has an effective area of about 66 $\mu m^2$ when the fiber optic cable has a length of 10 km. It is also found that when the length ratio between the first and second optical fibers is adjusted to be 0.5 at the same cable length, the effective area of the connected optical fiber 53 is considerably increased to about 71 $\mu m^2$. Thus, the effective area of the connected optical fiber 53 can be easily controlled by adjusting respective lengths or respective effective areas of the first and second optical fibers 51 and 52.

Finally, a description will be made in conjunction with a control for the four-wave mixing phenomenon depending on respective lengths of the first and second optical fibers 51 and 52.

Figure 11:
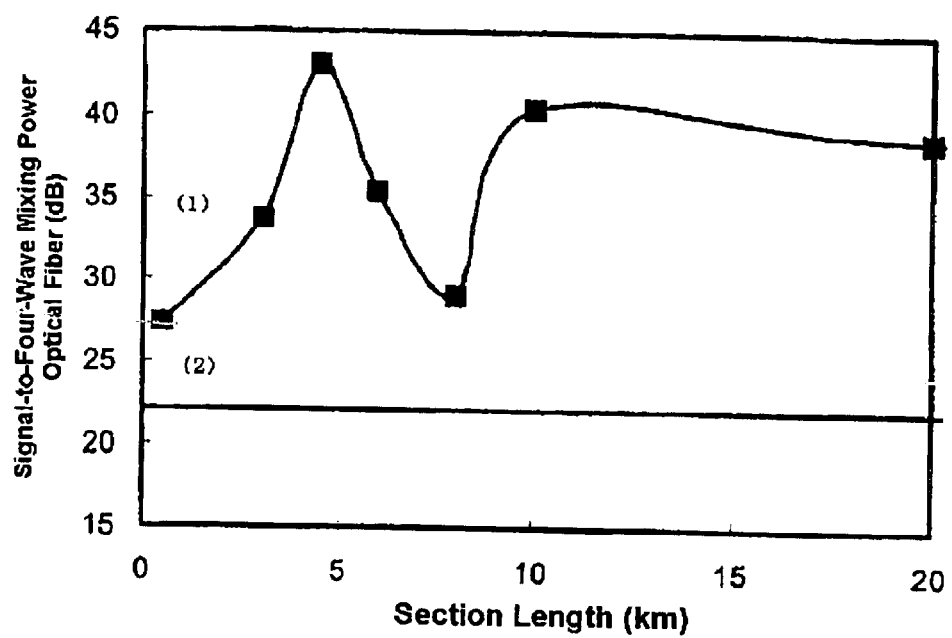
FIG. 11 is a graph depicting a control for the occurrence of a four-wave mixing phenomenon in the optical transmission system of FIG. 6a depending on the section length.

FIG. 11 is a graph depicting the relation between the section length and the four-wave mixing power ratio. Here, the section length corresponds to the length of the first or second optical fiber. For the convenience of description, it is assumed in the case of FIG. 11 that the first and second optical fibers have the same length. Of course, the first and second optical fibers may have different lengths, respectively. In FIG. 11, the graph (1) is associated with the fiber optic cable according to the present invention whereas the graph (2) is associated with the conventional NZ-DSF.

The inventors have found that where the first optical fiber 52 has a dispersion value of 17 ps/nm-km, and the second optical fiber 52 has a dispersion value of −11 ps/nm-km, four-wave mixing components generated in the first optical fiber 51 generate an offset interference at points of 3 km, 6 km, 9 km . . . with a length interval of 3 km while generating a reinforced interference at points of 1.5 km, 4.5 km, 7.5 km . . . with a length interval of 3 km. Four-wave mixing components generated in the second optical fiber 52 generate an offset interference at points of 4.5 km, 9 km, 13.5 km . . . with a length interval of 4.5 km while generating a reinforced interference at points of 6.75 km, 11.25 km . . . with a length interval of 4.5 km. In this case, the four-wave mixing components generated in the first and second optical fibers 51 and 52 generate a reinforced interference at a point of about 7 km while maintaining both the offset interference and the reinforced interference in certain magnitudes, respectively, in the span from the point of 3 km to the point of 6 km. As a result, only the relatively low four-wave mixing components are left. FIG. 11 shows the fact that in the optical transmission system using the fiber optic cable according to the present invention, a high signal-to-four-wave mixing power ratio is exhibited when the fiber optic cable has a section length of 3 to 6 km.

Referring to FIG. 11, it can also be found that the signal-to-four-wave mixing power ratio in the optical transmission system of the present invention increases at a section length exceeding 7 km, as compared to the case in which the section length ranges from 3 km to 6 km. In spite of such an increase in the signal-to-four-wave mixing power ratio, the four-wave mixing phenomenon is considerably suppressed, as compared to the conventional NZ-DSF. This can be found by referring to FIG. 11.

It is also found, by referring to FIG. 11, that an improvement in the signal-to-four-wave mixing power ratio is exhibited again in the optical transmission system of the present invention when the section length exceeds 10 km. Such a method of improving the signal-to-four-wave mixing power ratio is disclosed in an article by Tkach et al, in "Journal of Lightwave Technology", pp 263–300, Volume 13, 1995. Disclosed in this article is use of the combination of a single-mode optical fiber having a length of 8.4 km and a dispersion-shifted optical fiber having a length of 48 km to suppress the occurrence of a four-wave mixing phenomenon. In the article, Tkach et al pointed out that a satisfied phase matching condition is established at a short section length, thereby resulting in an increased four-wave mixing phenomenon. For this reason, in this method, its application to the cases using a short section length is substantially excluded.

However, the method disclosed in the article is impractical because it is difficult to manufacture a fiber optic cable having an excessively increased section length, as described in the article, and to handle the fiber optic cable. Practically, it is unusual to manufacture a fiber optic cable having a length of 15 km or more. Typically, the section length is set to about 7 km or less.

Taking into consideration the actual problems associated with the manufacture and installation of fiber optic cables, the inventors has found that even in the case of a fiber optic cable having a length of 10 km, it is possible to considerably suppress the occurrence of a four-wave mixing phenomenon by controlling the section length and respective dispersion values of the first and second optical fibers, as shown in FIG. 11.

The fact that the occurrence of a four-wave mixing phenomenon can be controlled, depending on respective length of the first and second optical fibers, in the optical transmission system according to the present invention can be understood bit referring to FIG. 11. As shown in FIG. 11, an appropriate length of the fiber optic cable used in the optical transmission system of the present invention is about 6 to 12 km in the case in which the connected optical fiber of the fiber optic cable is formed of two optical fibers of different kinds connected to each other. Where two fiber optic cables are connected to each other in order to form a connected fiber optic cable, the length of each fiber optic cable may have a length of 3 to 6 km. This means that the length of the fiber optic cable may be reduced to a length of 3 to 6 km.

The following Table 2 describes respective optimum dispersion values, respective optimum dispersion slops, and respective optimum effective areas of the first and second optical fibers practically determined in the case in which the fiber optic cable of the present invention is used in an optical transmission system with the configuration of FIG. 6a.

TABLE 2

| Characteristics | First Optical Fiber | Second Optical Fiber |
|---|---|---|
| Dispersion Value | 17 ps/nm-km | −11 ps/nm-km |
| Dispersion Slope | 0.08 ps/nm²-km | −0.08 ps/nm²-km |
| Effective Area | 80 μm² | 55 μm² |
| Section Length | 3 to 6 km | 3 to 6 km |

The dispersion value, dispersion slope, and effective area of the second optical fiber in Table 2 are those derived under the condition in which a conventional single-mode optical fiber having a relatively high positive dispersion value and a large effective area is used for the first optical fiber. Where such a single-mode optical fiber is used for the first optical fiber, it is possible to easily obtain dispersion characteristics and an effective area which are required in the present invention. It is also possible to reduce the manufacturing costs of the fiber optic cable according to the present invention. In addition, there is an advantage in that the manufacture of the fiber optic cable is easily achieved.

The above values of the second optical fiber are values which can be practically provided by the second optical fiber, sufficiently taking into consideration the problems possibly involved in the case wherein the second optical fiber is practically manufactured.

Where respective lengths of the first and second optical fibers are controlled within the above range, it is possible to utilize an offset interference occurring among four-wave mixing components. As a result, the occurrence of a four-wave mixing phenomenon can be further suppressed.

The inventors could found that transmission of an optical signal is carried out in a state, in which the influence of a four-wave mixing phenomenon on the optical signal is considerably suppressed, in the case wherein a connected optical fiber is formed of connected first and second optical fibers having values described in Table 2, and a fiber optic cable including the connected optical fiber is used in a WDM optical transmission system having a channel spacing of 50 GHz.

The values described in Table 2 are only those in an example of the present invention. The values of the first and second optical fibers used in the present invention are not limited to those described in Table 2. Those skilled in the art will appreciate that the values of the first and second optical fibers may be varied in accordance with a variation in the specification of an optical transmission system to which the fiber optic cable of the present invention is used.

As apparent from the above description, the fiber optic cable of the present invention, which includes a connected optical fiber configured by connecting first and second optical fibers of different kinds to each other in the same optical cable, can be applied to a WDM optical transmission system using a channel spacing of 50 GHz by controlling the dispersion value, dispersion slope, and effective area of the connected optical fiber to correspond to those allowed in the WDM optical transmission system in accordance with an adjustment for respective dispersion values, respective lengths, and respective effective areas of the first and second optical fibers forming the connected optical fiber. Accordingly, the fiber optic cable and optical transmission system according to the present invention provide an effect of maximizing the transmission capacity per optical fiber.

The above mentioned fiber optic cable of the present invention may be referred to as a "2-section type fiber optic cable" in that it is configured by connecting one first optical fiber and one second optical fiber to each other. Now, a description will be made in conjunction with a 3-section type fiber optic cable including a connection optical fiber formed of three optical fibers connected together, and an optical transmission system using the 3-section type fiber optic cable.

Figure 12:
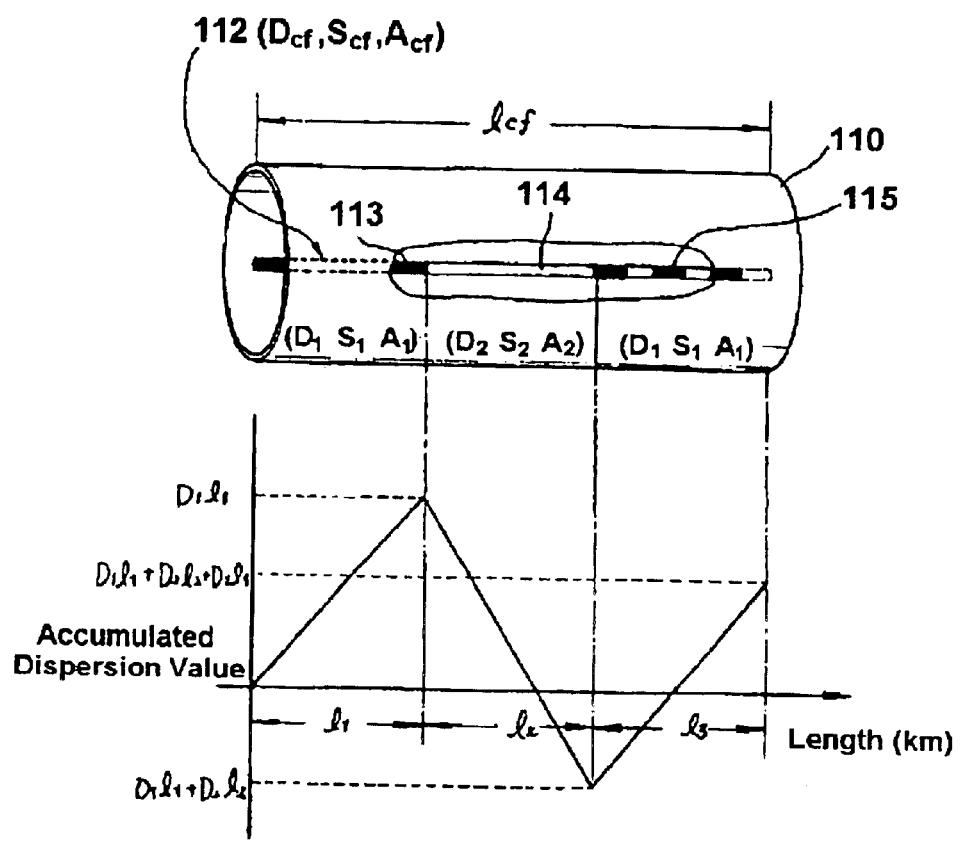
FIG. 12 is a schematic view illustrating the concept of a 3-section type fiber optic cable according to the present invention.

Referring to FIG. 12, the concept of a 3-section type fiber optic cable according to the present invention is illustrated. This 3-section type fiber optic cable is similar to the 2-section type fiber optic cable shown in FIG. 5, except for an addition of a third optical fiber 115 which has the same dispersion value, dispersion slope, and effective area as those of the first optical fiber denoted by the reference numeral 113 while having a length different from that of the first optical fiber 113. Accordingly, respective dispersion values, respective dispersion slopes, respective lengths, and respective effective areas of the first and second optical fibers 113 and 114 in the 3-section type fiber optic cable may be represented by the same characters as those for the 2-section type fiber optic cable. The dispersion value, dispersion slope, length, and effective area of the third optical fiber 115 may be represented by "$D_1$", "$S_1$", "$l_1$", and "$A_1$", respectively.

The average dispersion value, dispersion slope, and effective area of the connected optical fiber 112 in the 3-section type fiber optic cable can be determined by the following Equations 4, 5, and 6, respectively:

$$D_{cf}(\lambda) = \frac{D_1(\lambda)l_1 + D_2(\lambda)l_2 + D_1(\lambda)l_3}{l_1 + l_2 + l_3} \quad \text{[Equation 4]}$$

$$S_{cf}(\lambda) = \frac{\partial D_{cf}(\lambda)}{\partial \lambda} = \frac{\frac{\partial D_1(\lambda)}{\partial \lambda}l_1 + \frac{\partial D_2(\lambda)}{\partial \lambda}(\lambda)l_2 + \frac{\partial D_1(\lambda)}{\partial \lambda}l_3}{l_1 + l_2 + l_3} = \frac{S_1(\lambda)l_1 + S_2(\lambda)l_2 + S_1(\lambda)l_3}{l_1 + l_2 + l_3} \quad \text{[Equation 5]}$$

$$A_{cf} = \frac{L_1 L_2 L_3 - 1}{\frac{\alpha_3}{\alpha_1}\frac{(L_1 - L_1 L_2 + L_1 L_2 L_3 - 1)}{A_1} + \frac{\alpha_3}{\alpha_2}\frac{L_1(L_2 - 1)}{A_2}} \quad \text{[Equation 6]}$$

In Equation 6, "$\alpha_1$" and "$\alpha_2$" represent respective loss indicia (/km) of the first and second optical fibers 113 and 114 and can be expressed by "$\alpha_1 = 0.1 \times a_1 \times \log(10)$" and "$\alpha_2 = 0.1 \times a_2 \times \log(10)$", respectively. "a_{1}" and "a_{2}" represent respective loss coefficients (dB/km) of the first and second optical fibers 113 and 114. Also, "$a_3$" is expressed by $$"\alpha_3 = \frac{\alpha_1 l_1 + \alpha_2 l_2 + \alpha_1 l_3}{l_1 + l_1 + l_3} \text{ (/km)",}$$

and "L1" and "L2" are expressed by "$L_1 = \exp(-\alpha_1 l_1)$", "$L_2 = \exp(-\alpha_2 l_2)$" and "$L_3 = \exp(-\alpha_1 l_3)$", respectively.

As apparent from the above Equations 4, 5, and 6, the dispersion value $D_{cf}$, dispersion slope $S_{cf}$, and effective area $A_{cf}$ of the connected optical fiber 112 are controlled, based on respective dispersion characteristics, respective lengths, and respective effective areas of the first, second, and third optical fibers 113, 114, and 115.

The average dispersion value of the connected optical fiber 112 determined by Equation 4 is designed to always have a non-zero value.

FIG. 12 illustrate a graph depicting a variation in the accumulated dispersion value of the connected optical fiber 112 in the fiber optic cable 110 depending on the length. In the fiber optic cable 110 of FIG. 12, the first optical fiber 113 is designed to have a positive dispersion value whereas the second optical fiber 114 is designed to have a negative dispersion value, for the convenience of description. Of course, the first and second optical fibers 113 and 114 are not limited to the above condition.

As shown in FIG. 12, the accumulated dispersion value of the connected optical fiber 112 increases gradually by virtue of the first optical fiber 113 having a high positive dispersion value. This increase of the accumulated dispersion value is continued over the length $l_1$ of the first optical fiber 113, so that the resultant accumulated dispersion value corresponds to a value of "$D_1 l_1$". By virtue of such a high accumulated dispersion value, it is possible to very efficiently suppress the occurrence of a four-wave mixing phenomenon in the optical cable 110. Thereafter, a compensation for the accumulated dispersion value "$D_1 l_1$" is begun by the second optical fiber 114 having a high negative dispersion value. As a result, the accumulated dispersion value has a negative value at a point, corresponding to a length of "$l_1 + l_2$", where the second optical fiber 114 terminates. From this point, the accumulated dispersion value is increased to have a positive value by the third optical fiber 115 having a high positive dispersion value.

As apparent from the above description, the occurrence of a four-wave mixing phenomenon is considerably suppressed by virtue of a high accumulated dispersion value generated during the travel of an optical signal in the fiber optic cable 110, and an average dispersion value of the connected optical fiber 112 maintained to be low. Therefore, the 3-section type fiber optic cable 110 can control both the dispersion value and non-linearity of the connected optical fiber 112.

Figure 13A:
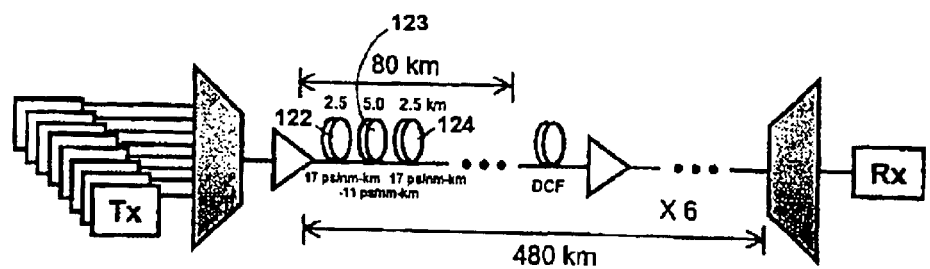
FIG. 13a is a schematic view illustrating an example of a 8-channel WDM optical fiber system having a channel of 50 GHz while using 3-section type fiber optic cables according to the present invention.

FIG. 13a schematically illustrates an example of a WDM optical transmission system using 3-section fiber optic cables each having the configuration of FIG. 12. For an easy comparison with the case using NZ-DSFs and the case using 2-section type fiber optic cables, the optical transmission system of FIG. 13a has the same system specification as that described in Table 1.

As shown in FIG. 13a, the first optical fiber, which is denoted by the reference numeral 122, exhibits a dispersion value of +17 ps/nm-km, and has a length of 2.5 km and an effective area of 80 $\mu m^2$. The second optical fiber, which is denoted by the reference numeral 123, exhibits a dispersion value of −11 ps/nm-km, and has a length of 5 km and an effective area of 55 $\mu m^2$. The third optical fiber, which is denoted by the reference numeral 124, exhibits a dispersion value of +17 ps/nm-km, and has a length of 2.5 km. Although the third optical fiber 124 is designed to have the same dispersion value and length as those of the first optical fiber 122 in the case of FIG. 13a, it may have values. different from those of the first optical fiber 122.

Figure 13B:
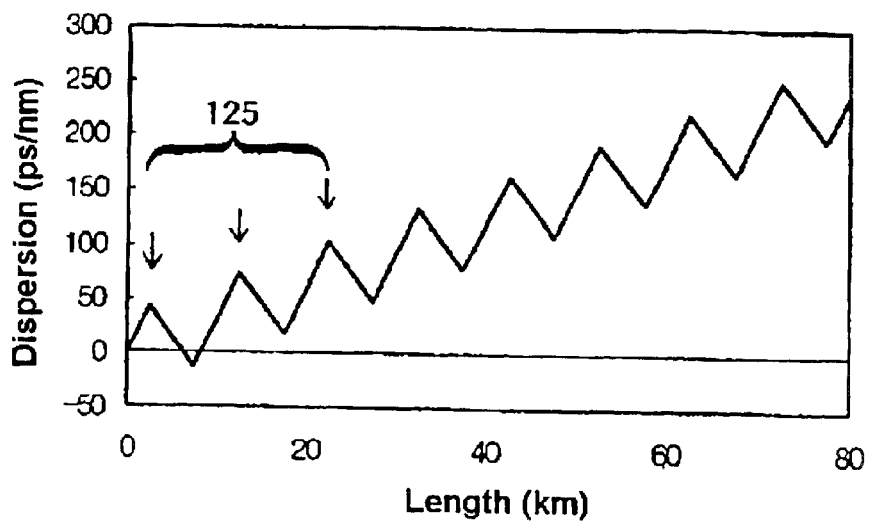
FIG. 13b is a graph depicting a variation in accumulated dispersion value exhibited in an optical amplifier section of the optical transmission system, shown in FIG. 13a, depending on the optical fiber length.

FIG. 13b illustrates a variation in dispersion value. exhibited in the optical transmission system using 3-section type fiber optic cables each having the above mentioned configuration. In this optical transmission system, an average dispersion value of 3 ps/nm-km is maintained for each fiber optic cable. A high accumulated dispersion value 125 is also repeatedly exhibited in the fiber optic cables, as in the 2-section type fiber optic cables. By virtue of such a low average dispersion value and such a high accumulated dispersion value, the occurrence of a four-wave mixing phenomenon is sufficiently suppressed in each fiber optic cable.

Figure 14A:
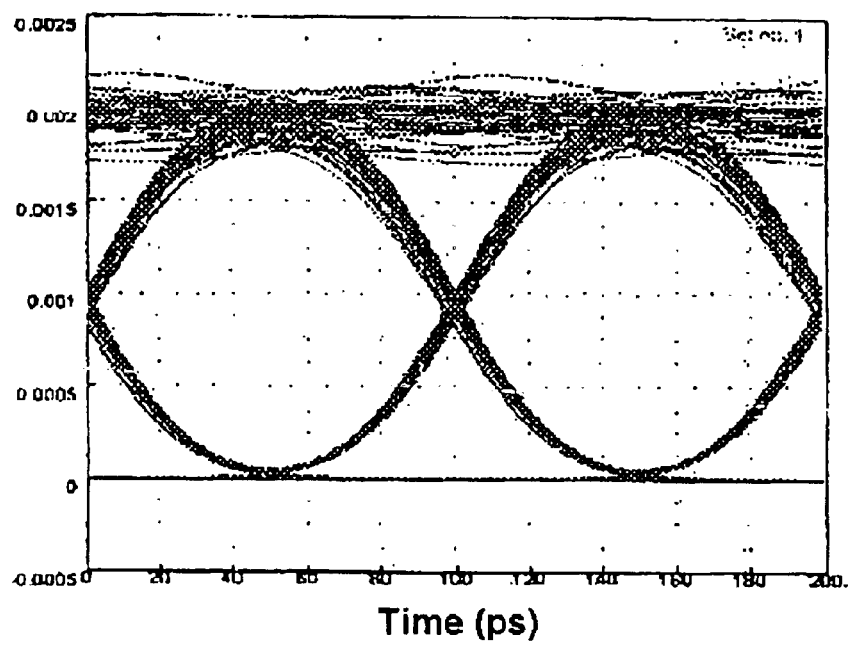
Figure 14B:
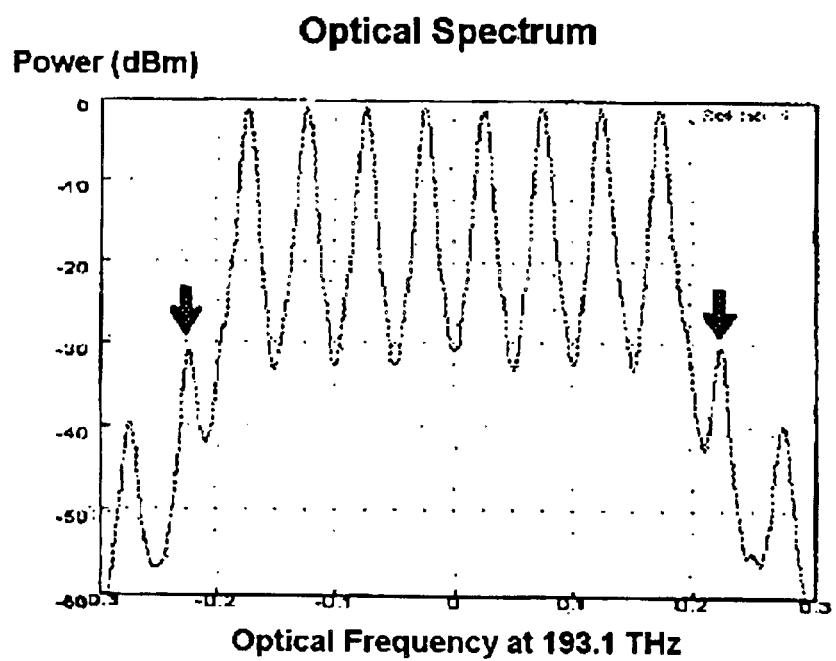

The operation characteristics of the optical transmission system of FIG. 13a are depicted by an eye diagram of FIG. 14 and an optical signal spectrum of FIG. 14b, respectively. Referring to FIGS. 14a and 14b, it can be found that even in a 50 GHz optical transmission system, the occurrence of a four-wave mixing phenomenon is sufficiently suppressed, and the eye of an optical signal is clearly opened. That is, a considerable improvement in system performance is obtained in this optical transmission system, as compared to a 50 GHz optical transmission system using conventional NZ-DSFs.

As apparent from the above description, where a WDM optical transmission system is implemented using fiber optic cables according to the present invention, which may be either the 2-section type optical cables or the 3-section type optical cables, it can have system operation characteristics considerably improved over those of a WDM optical transmission system using convention NZ-DSFs.

There is only a difference between the systems respectively using the 2-section type optical cables and the 3-section type optical cables in that the 2-section type optical cable has one connection point whereas the 3-section type optical cable has two connection points. Taking only the connection loss into consideration, the system using the 2-section type optical cables may be more advantageous.

The 2-section type optical cable and the 3-section type optical cable may have a characteristic difference therebetween because they use different arrangements of optical fibers forming respective connected optical fibers thereof.

Figure 15A:
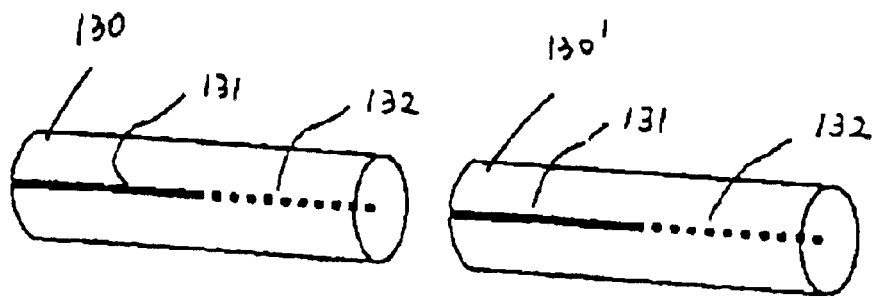
FIGS. 15a to 15c are schematic view respectively illustrating different connection states of fiber optic cables in accordance with the present invention.
Figure 15B:
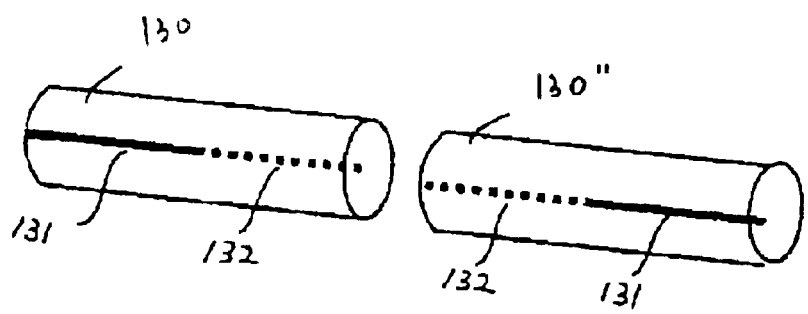

Referring to FIGS. 15a and 15b, the cases in which 2-section type fiber optic cables are connected to each other are illustrated, respectively. In the case of FIG. 15a, the connection of the 2-section type fiber optic cables is carried out in such a fashion that optical fibers of different kinds are connected to each other. That is, in accordance with the connection of FIG. 15a, a fiber optic cable 130 having an optical fiber arrangement of a fist optical fiber 130' and a second optical fiber 132 arranged in this order is connected with another fiber optic cable 131 having the same optical fiber arrangement as the fiber optic cable 130. In the case of FIG. 15b, the connection of the 2-section type fiber optic cables is carried out in such a fashion that optical fibers of the same kind are connected to each other. That is, in accordance with the connection of FIG. 15b, the fiber optic cable 130 having an optical fiber arrangement of the fist optical fiber 131 and the second optical fiber 132 arranged in this order is connected with another fiber optic cable 130" having an optical fiber arrangement of the second optical fiber 132 and the first optical fiber 131 arranged in this order. In this case, the length of the second optical fiber 132 is doubled when viewed in the entire fiber optic cable of the connected state.

The doubled length of the second optical fiber makes it possible to correspondingly reduce the cable length. Where the first and second optical fibers have a length of 3 km, respectively, as described in Table 2, the resultant fiber optic cable should have a length of 6 km. However, where respective second optical fibers 132 of adjacent fiber optic cables are connected to each other, as in the case of FIG. 15b, the length of 3 km required for each second optical fiber in the entire connected fiber optic cable can be obtained using second optical fibers 132 each having a length of 1.5 km. Therefore, it is possible to manufacture fiber optic cables each having a length of 3 km. Also, the connection between optical fibers of the same kind provides an advantage in that the connection between fiber optic cables can be easily made.

Figure 15C:
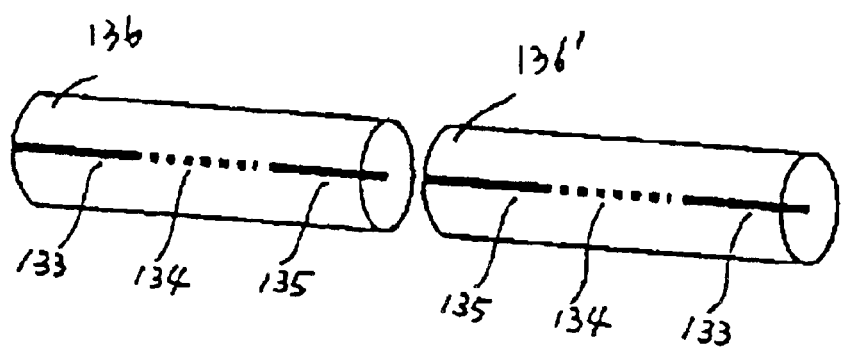

On the other hand, the connection of 3-section type fiber optic cables is carried out only in such a fashion that optical fibers of the same kind are connected to each other. As shown in FIG. 15c, the connection of adjacent fiber optic cables is carried out in such a fashion that the third or first optical fiber 135 or 133 of one fiber optic cable 136 is connected to the third or first optical fiber 135 or 133 of another fiber optic cable 136' adjacent to the fiber optic cable 136. Such a connection between optical fibers of the same kind. provides an advantage in that the connection between fiber optic cables in a practical cable installation can be easily made.

Thus, it is possible to maximize the advantages of the configuration according to the present invention by appropriately determining the arrangement of optical fibers required to control the dispersion characteristics of the connected optical fiber in each fiber optic cable, and the arrangement of those optical fibers required for an easy connection between fiber optic cables and a reduction in the length of each fiber optic cable.

INDUSTRIAL APPLICABILITY

As apparent from the above description, the present invention provides a fiber optic cable which includes a connected optical fiber formed by connecting optical fibers of different kinds having different characteristics to each other in the same fiber optic cable while having a dispersion value, an effective area, and a dispersion slope controlled to correspond to those required in an optical transmission system in accordance with an adjustment for respective dispersion values, respective lengths, respective effective areas, and respective dispersion slopes of those optical fibers. The total length of the connected optical fibers of the same kind in the connected fiber optic cable is adjustable so as to further suppress a non-linearity of the optical fibers. The fiber optic cable of the present invention can be easily designed to have optimum dispersion characteristics and an optimum effective area required in a WDM optical transmission system having a channel spacing of 50 GHz. Since this design can be made for unit cables, it is easy and provides an improved accuracy, as compared to the case in which a design is made for the entire fiber optic cable.

Although the present invention has been described in conjunction with 2-section type fiber optic cables and 3-section type fiber optic cables, they are exemplified only for the convenience of description. Accordingly, the configuration according to the present invention is not limited to such types of fiber optic cables. The system specification and the dispersion characteristics and effective areas of optical fibers specifically defined in the above description are intended only for the convenience of description, and are not to be construed to limit the present invention.

For the optical fibers intended to be used the present invention, conventional optical fibers may be used. However, the optical fibers of the present invention are not limited to those conventional optical fibers. Any optical fibers including optical fibers newly developed may be used in so far as they meet objects and applications of the present invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A fiber optic cable for a wavelength division multiplexing (WDM) optical transmission system including a plurality of connected optical fibers, wherein each of the connected optical fibers is formed of a plurality of optical fibers respectively exhibiting different dispersion values and different dispersion slopes in a predetermined operating wavelength range while having different lengths and different effective areas, the optical fibers being connected to one another in an optional order.

2. The fiber optic cable according to claim 1, wherein the different dispersion values and different lengths of the optical fibers in each of the connected optical fibers are controlled so that the connected optical fiber has an average dispersion value corresponding to a value required in the WDM optical transmission system.

3. The fiber optic cable according to claim 1, wherein the different dispersion values, different slopes, and different lengths of the optical fibers in each of the connected optical fibers are controlled so that the connected optical fiber has an average dispersion slope corresponding to a value required in the WDM optical transmission system.

4. The fiber optic cable according to claim 1, wherein the different effective areas and different lengths of the optical fibers in each of the connected optical fibers are controlled so that the connected optical fiber has an average effective area corresponding to a value required in the WDM optical transmission system.

5. The fiber optic cable according to claim 1, wherein at least a part of the different dispersion values are +2 ps/nm-km or more, and at least the other part of the different dispersion values are −2 ps/nm-km or less.

6. The fiber optic cable according to claim 5, wherein the optical fibers of each of the connected optical fibers are connected to one another in such a fashion that adjacent ones of the optical fibers have dispersion values of opposite signs, respectively, while exhibiting a dispersion value difference of at least 10 ps/nm-km there between.

7. The fiber optic cable according to claim 1, wherein each of the connected optical fibers has a length of 0.5 to 20 km.

8. The fiber optic cable according to claim 1, wherein the connected optical fiber has an average dispersion value raging from 1 ps/nm-km to 10 ps/nm-km.

9. The fiber optic cable according to claim l, wherein the operating wavelength range is selected from the group consisting of a range from 1,300 nm to 1,530 nm, a range from 1,400 nm to 1,565 nm, and a range from 1,530 nm to 1,650 nm.

10. A fiber optic cable for a wavelength division multiplexing (WDM) optical transmission system including a plurality of connected optical fibers, wherein each of the connected optical fibers comprises: a first optical fiber exhibiting a first dispersion value and a first dispersion slope in a predetermined operating wavelength range while having a first length and a first effective area; and a second optical fiber exhibiting a second dispersion value and a second dispersion slope in the predetermined operating wavelength range while having a second length and a second effective area; the first and second optical fibers being connected together in an optional order.

11. The fiber optic cable according to claim 10, wherein the first dispersion value and first length of the first optical fiber and the second dispersion value and second length of the second optical fiber are controlled so that an associated one of the connected optical fibers has an average dispersion value corresponding to a value required in the WDM optical transmission system.

12. The fiber optic cable according to claim 11, wherein the first dispersion value of the first optical fiber, the second dispersion value of the second optical fiber, and the average dispersion value of the associated connected optical fiber are function of an operating wavelength (λ), and the average dispersion value of the connected optical fiber is determined by the following equation:

$$D_{ef}(\lambda) = \frac{D_1(\lambda)l_1 + D_2(\lambda)l_2}{l_1 + l_2}$$

in the equation,
"$D_{cf}$" represents the average dispersion value (ps/nm-km) of the connected optical fiber;
"$D_1$" represents the first dispersion value (ps/nm-km) of the first optical fiber;
"$D_2$" represents the second dispersion value (ps/nm-km) of the first optical fiber;
"$l_1$" represents the first length (km) of the first optical fiber; and
"$l_2$" represents the second length (km) of the second optical fiber.

13. The fiber optic cable according to claim 10, wherein the first dispersion value, first dispersion slope, and first length of the first optical fiber and the second dispersion value, second dispersion slope, and second length of the second optical fiber are controlled so that an associated one of the connected optical fibers has a dispersion value corresponding to a value required in the WDM optical transmission system.

14. The fiber optic cable according to claim 13, wherein the first dispersion value and first dispersion slope of the first optical fiber, the second dispersion value and second dispersion slope of the second optical fiber, and the dispersion value and dispersion slope of an associated one of the connected optical fibers are function of an operating wavelength (λ), and the dispersion value of the connected optical fiber is determined by the following equation:

$$S_{ef}(\lambda) = \frac{\partial D_{ef}(\lambda)}{\partial \lambda} = \frac{\frac{\partial D_1(\lambda)}{\partial \lambda}l_1 + \frac{\partial D_2(\lambda)}{\partial \lambda}l_2}{l_1 + l_2} = \frac{S_1(\lambda)l_1 + S_2(\lambda)l_2}{l_1 + l_2}$$

In the equation,
"$S_{cf}$" represents the dispersion slope (ps/nm²-km) of the connected optical fiber;
"$D_{cf}$" represents the average dispersion value (ps/nm-km) of the connected optical fiber;
"$D_1$" represents the first dispersion value (ps/nm-km) of the first optical fiber,
"$D_2$" represents the second dispersion value (ps/nm-km) of the fist optical fiber;
"$S_1$" represents the first dispersion slope (ps/nm²-km) of the first optical fiber;
"$S_2$" represents the second dispersion slope (ps/nm²-km) of the second optical fiber;
"$l_1$" represents the first length (km) of the first optical fiber; and
"$l_2$" represents the second length (km) of the second optical fiber.

15. The fiber optic cable according to claim 10, wherein the first length and first effective area of the first optical fiber and the second length and second effective area of the second optical fiber are controlled so that an associated one of the connected optical fibers has an effective area corresponding to a value required in the WDM optical transmission system.

16. The fiber optic cable according to claim 15, wherein the effective area of the connected optical fiber is fiber determined by the following equation:

$$A_{ef} = \frac{L_1 L_2 - 1}{\frac{\alpha_3}{\alpha_1}\frac{L_1 - 1}{A_1} + \frac{\alpha_3}{\alpha_3}\frac{L_1(L_2 - 1)}{A_2}}$$

in the equation,
"$A_{cf}$" represents the effective area (μm²) of the connected optical fiber;
"$l_1$" represents the first length (km) optical fiber;
"$l_2$" represents the second length (km) of the second optical fiber;
"$\alpha_1$" represents a loss index (/km) of the first optical fiber;
"$\alpha_2$" represents a loss index (/km) of the second optical fiber;

$$"\alpha_3 = \frac{\alpha_1 l_1 + \alpha_2 l_2}{l_1 + l_1}"$$

"$\alpha_3$" is expressed by
"$\alpha_1$" is expressed by "$\alpha_1 = 0.1 \times a_1 \times \log(10)$";
"$\alpha_2$" is expressed by "$\alpha_1 = 0.1 \times a_2 \times \log(10)$";
"a_{1}" represents a loss coefficient (dB/km) of the first optical fiber;
"a_{2}" represents a loss coefficient (dB/km) of the second optical fiber;
"L1" is expressed by "$L_1 = \exp(-\alpha_1 l_1)$"; and
"L2" is expressed by "$L_2 = \exp(-\alpha_2 l_2)$".

17. The fiber optic cable according to claim 10, wherein the first and second dispersion values have opposite signs, respectively, while exhibiting a difference of at least 10 ps/nm-km there between.

18. The fiber optic cable according to claim 10, wherein the first dispersion slope has a positive value, and the second dispersion slope has a negative value.

19. The fiber optic cable according to claim 10, wherein the first and second dispersion slopes have positive values, respectively.

20. The fiber optic cable according to claim 10, wherein the first dispersion value of the first optical fiber ranges from +4 ps/nm-km to +20 ps/nm-km at a central wavelength in the operating wavelength range, and the second dispersion value of the second optical fiber ranges from −20 ps/nm-km to −4 ps/nm-km at the central wavelength in the operating wavelength range.

21. The fiber optic cable according to claim 20, wherein the first dispersion value ranges from 15 ps/nm-km to 18 ps/nm-km, and the second dispersion value ranges from −12 ps/nm-km to −9 ps/nm-km.

22. The fiber optic cable according to claim 21, wherein the first and second lengths of the first and second optical fibers range from 3 km to 6 km, respectively.

23. The fiber optic cable according to claim 10, wherein the first dispersion slope has a value of +0.1 ps/nm²-km or less, and the second dispersion slope has a value of −0.1 ps/nm²-km.

24. The fiber optic cable according to claim 10, wherein the first and second dispersion slopes have values of +0.1 ps/nm²-km or less, respectively.

25. The fiber optic cable according to claim 10, wherein the first effective area ranges from 50 μm² to 90 μm², and the second effective area ranges from 30 μm² to 80 μm².

26. The fiber optic cable according to claim 10, wherein the first and second optical fibers exhibit a dispersion value of 0 in a wavelength range of 1,300 to 1,550 nm.

27. The fiber optic cable according to claim 10, wherein the first optical fiber exhibits a dispersion value of 0 in a wavelength range of 1,300 to 1,500 nm, and the second optical fiber exhibits a dispersion value of 0 at a wavelength of 1,600 nm or more.

28. A fiber optic cable for a wavelength division multiplexing (WDM) optical transmission system including a plurality of connected optical fibers, wherein each of the connected optical fibers comprises:

a first optical fiber exhibiting a first dispersion value and a first dispersion slope in a predetermined operating wavelength range while having a first length and a first effective area;

a second optical fiber exhibiting a second dispersion value and a second dispersion slope at the predetermined operating wavelength range while having a second length and a second effective area; and a third optical fiber exhibiting the first dispersion value and the first dispersion slope at the predetermined operating wavelength range while having a third length and the first effective area;

the first optical fiber, the second optical fiber, and the third optical fiber being connected to one another in this order.

29. The fiber optic cable according to claim 28, wherein the first dispersion value and first length of the first optical fiber, the second dispersion value and second length of the second optical fiber, and the first dispersion value and third length of the third optical fiber are controlled so that an associated one of the connected optical fibers has an average dispersion value corresponding to a value required in the WDM optical transmission system.

30. The fiber optic cable according to claim 29, wherein the first dispersion value of the first and third optical fibers, the second dispersion value of the second optical fiber, and the average dispersion value of the associated connected optical fiber are function of an operating wavelength ($\lambda$) and the average dispersion optical fiber is determined by value of the following equation:

$$D_{ef}(\lambda) = \frac{D_1(\lambda)l_1 + D_2(\lambda)l_2 + D_1(\lambda)l_3}{l_1 + l_2 + l_3}$$

in the equation,

"$D_{cf}$" represents the average dispersion value (ps/nm-km) of the connected optical fiber;

"$D_1$" represents the first dispersion value (ps/nm-km) of the first optical fiber;

"$D_2$" represents the second dispersion value (ps/nm-km) of the first optical fiber;

"$l_1$" represents the first length (km) of the first optical fiber;

"$l_2$" represents the second length (km) of the second optical fiber; and

"$l_3$" represents the third length (km) of the third optical fiber.

31. The fiber optic cable according to claim 28, wherein the first dispersion value, first dispersion slope, and first length of the first optical fiber, the second dispersion value, second dispersion slope, and second length of the second optical fiber, and the first dispersion value, first dispersion slope, and third length of the third optical fiber are controlled so that an associated one of the connected optical fibers has a dispersion value corresponding to a value required in the WDM optical transmission system.

32. The fiber optic cable according to claim 31, wherein the first dispersion value and first dispersion slope of the first and third optical fibers, the second dispersion value and second dispersion slope of the second optical fiber, and the average dispersion value and dispersion slope of an associated one of the connected optical fibers are function of an operating wavelength ($\lambda$), and the dispersion value of the connected optical fiber is determined by the following equation:

$$S_{ef}(\lambda) = \frac{\partial D_{ef}(\lambda)}{\partial \lambda} = \frac{\frac{\partial D_1(\lambda)}{\partial \lambda}l_1 + \frac{\partial D_2(\lambda)}{\partial \lambda}l_2 + \frac{\partial D_1(\lambda)}{\partial \lambda}(\lambda)l_2}{l_1 + l_2 + l_3} = \frac{S_1(\lambda)l_1 + S_2(\lambda)l_2 + S_1(\lambda)l_3}{l_1 + l_2 + l_3}$$

in the equation,

"$S_{cf}$" represents the dispersion slope (ps/nm$^2$-km) of the connected optical fiber;

"$D_{cf}$" represents the average dispersion value (ps/nm-km) of the connected optical fiber;

"$D_1$" represents the first dispersion value (ps/nm-km) of the first optical fiber;

"$D_2$" represents the second dispersion value (ps/nm-km) of the first optical fiber;

"$l_1$" represents the first length (km) of the first optical fiber;

"$l_2$" represents the second length (km) of the second optical fiber;

"$l_3$" represents the third length (km) of the third optical fiber;

"$S_1$" represent the first dispersion slope (ps/nm$^2$-km) of the first optical fiber; and "$S_2$" represents the second dispersion slope (ps/nm$^2$-km) of the second optical fiber.

33. The fiber optic cable according to claim 28, wherein the first length and first effective area of the first optical fiber, the second length and second effective area of the second optical fiber, and the third length and first effective area of the third optical fiber are controlled so that an associated one of the connected optical fibers has an effective area corresponding to a value required in the WDM optical transmission system.

34. The fiber optic cable according to claim 33, wherein the effective area of the connected optical fiber is determined by the following equation:

$$A_{ef} = \frac{L_1 L_2 L_3 - 1}{\frac{\alpha_3}{\alpha_1} \frac{(L_1 - L_1 L_2 + L_1 L_2 L_3 - 1)}{A_1} + \frac{\alpha_3}{\alpha_2} \frac{L_1(L_2 - 1)}{A_2}}$$

in the equation

"$A_{cf}$" represents the effective connected area ($\mu$m2) of the connected optical fiber;

"$l_1$" represents the first length (km) of the first optical fiber;

"$l_2$" represents the second length (km) of the second optical fiber;

"$l_3$" represents the third length (km) of the third optical fiber;

"$\alpha_1$" represents a loss index (/km) of the first optical fiber;

"α₂" represents a loss index (/km) of the second optical fiber;

$$\alpha_3 = \frac{\alpha_1 l_1 + \alpha_2 l_2 + \alpha_1 l_3}{l_1 + l_1 + l_3} \ (/\text{km})";$$

"α₃" is expressed by
"α₁" is expressed by "α₁=0.1×a₁×log (10)";
"α₂" is expressed by "α₂=0.1×a₁×log (10)";
"a_{1}" represents a loss coefficient (dB/km) of the first optical fiber;
"a_{2}" represents a loss coefficient (dB/km) of the second optical fiber;
"L1" is expressed by "L₁=exp(-α₁l₁)";
"L2" is expressed by "L₂=exp(-α₂l₂)"; and
"L3" is expressed by "L₃=exp(-α₃l₃)".

35. The fiber optic cable according to claim 28, wherein the first and second dispersion values have opposite signs, respectively, while exhibiting a difference of at least 10 ps/nm-km there between.

36. The fiber optic cable according to claim 28, wherein the first dispersion slope has a positive value, and the second dispersion slope has a negative value.

37. The fiber optic cable according to claim 28, wherein the first and second dispersion slopes have positive values, respectively.

38. The fiber optic cable according to claim 28, wherein the first dispersion value of the first optical fiber ranges from +4 ps/nm-km to +20 ps/nm-kn at a central wavelength in the operating wavelength range, and the second dispersion value of the second optical fiber ranges from −20 ps/nm-km to −4 ps/nm-km at the central wavelength in the operating wavelength range.

39. The fiber optic cable according to claim 38, wherein the first dispersion value ranges from 15 ps/nm-km to 18 ps/nm-km, and the second dispersion value ranges from −12 ps/nm-km to −9 ps/nm-km.

40. The fiber optic cable according to claim 39, wherein the first, second, and third lengths range from 3 km to 6 km, respectively.

41. The fiber optic cable according to claim 26, wherein the first dispersion slope has a value of +0.1 ps/nm²-km or less, and the second dispersion slope has a value of −0.1 ps/nm²-km.

42. The fiber optic cable according to claim 28, wherein the first and second dispersion slopes have values of +0.1 ps/nm²-km or less, respectively.

43. The fiber optic cable according to claim 28, wherein the first effective area ranges from 50 μm² to 90 μm², and the second effective area ranges from 30 μm² to 80 μm².

44. The fiber optic cable according to claim 28, wherein the first, second, and third optical fibers exhibit a dispersion value of 0 in a wavelength range of 1,300 to 1,500 nm.

45. The fiber optic cable according to claim 28, wherein the first optical fiber exhibits a dispersion value of 0 in a wavelength range of 1,300 to 1,500 nm, and the second optical fiber exhibits a dispersion value of 0 at a wavelength of 1,600 nm or more.

46. A wavelength division multiplexing (WDM) optical transmission system having a predetermined channel spacing and a predetermined number of channels, comprising:
a transmitting terminal for providing a plurality of optical signals respectively having different wavelengths;
a multiplexer connected to the transmitting terminal and adapted to multiplex the optical signals;
a plurality of fiber optic cables each including a plurality of connected optical fibers, each of the connected optical fibers being formed of a plurality of optical fibers respectively exhibiting different dispersion values and different dispersion slopes in a predetermined operating wavelength range while having different lengths and different effective areas, the optical fibers being connected to ones another in an optional order;
connecting means for interconnecting the fiber optic cables;
optical amplifiers for amplifying the optical signal being transmitted through the fiber optic cables;
a demultiplexer for demultiplexing the optical signal transmitted through the fiber optic cables; and
a receiving terminal connected to the demultiplexer and adapted to receive the demultiplexed optical signal.

47. The WDM optical transmission system according to claim 46, wherein the channel spacing is 50 GHz.

48. The WDM optical transmission system according to claim 46, wherein the channel spacing is 100 GHz or more.

49. A wavelength division multiplexing (WDM) optical transmission system having a predetermined channel spaying and a predetermined number of channels, comprising:
a transmitting terminal for providing a plurality of optical signals respectively having different wavelengths;
a multiplexer connected to the transmitting terminal and adapted to multiplex the, optical signals;
a plurality of fiber optic cables each including a plurality of connected optical fibers, each of the connected optical fibers including a first optical fiber exhibiting a first dispersion value and a first dispersion slope in a predetermined operating wavelength range while having a first length and a first effective area, and a second optical fiber exhibiting a second dispersion value and a second dispersion slope in the predetermined operating wavelength range while having a second length and a second effective area, the first and second optical fibers being connected together in an optional order;
connecting means for interconnecting the fiber optic cables;
optical amplifiers for amplifying the optical signal being transmitted through the fiber optic cables;
a demultiplexer for demultiplexing the optical signal transmitted through the fiber optic cables; and
a receiving terminal connected to the demultiplexer and adapted to receive the demultiplexed optical signal.

50. The WDM optical transmission system according to claim 49, wherein the connecting mean connects the first optical fiber of a selected one of the fiber optic cables to the first optical fiber of another one of the fiber optic cables adjacent to the first optical fiber of the selected fiber optic cable while controlling a length of the resultant connected first optical fiber.

51. The WDM optical transmission system according to claim 49, wherein the connecting means connects the first optical fiber of a selected one of the fiber optic cables to the second optical fiber of another one of the fiber optic cables adjacent to the first optical fiber of the selected fiber optic cable on an optical line.

52. A wavelength division multiplexing (WDM) optical transmission system having a predetermined channel spacing and a predetermined number of channels, comprising:
a transmitting terminal for providing a plurality of optical signals respectively having different wavelengths; a multiplexer connected to the transmitting terminal and adapted to multiplex the optical signals;

a plurality of fiber optic cables each including a plurality of connected optical fibers, each of the connected optical fibers including a first optical fiber exhibiting a first dispersion value and a first dispersion slope in a predetermined operating wavelength range while having a first length and a first effective area, a second optical fiber exhibiting a second dispersion value and a second dispersion slope at the predetermined operating wavelength range while having a second length and a second effective area, a third first dispersion value and the predetermined operating wavelength range while having a third length and the first effective area, the first optical fiber, the second optical fiber, and the third optical fiber being connected to one another in this order;

connecting means for interconnecting the fiber optic cables; optical amplifiers for amplifying the optical signal being transmitted through the fiber optic cables;

a demultiplexer for demultiplexing the optical signal transmitted through the fiber optic cables; and a receiving terminal connected to the demultiplexer and adapted to receive the demultiplexed optical signal.

53. The WDM optical tranmission system according to claim 52, wherein the connecting means connects the first optical fiber of a selected one of the fiber optic cables to the first optical fiber of another one of the fiber optic cables adjacent to the first optical fiber of the selected fiber optic cable while generating a minimum connection loss.

54. The WDM optical transmission system according to claim 52, wherein the connecting means connects the third optical fiber of a selected one of the fiber optic cables to the first optical fiber of another one of the fiber optic cables adjacent to the third optical fiber of the selected fiber optic cable while generating a minimum connection loss.

* * * * *